US008868625B2

(12) United States Patent
Itabashi et al.

(10) Patent No.: US 8,868,625 B2
(45) Date of Patent: Oct. 21, 2014

(54) INFORMATION PROCESSING DEVICE, DATA PROCESSING SYSTEM AND METHOD, AND COMPUTER PROGRAM

(75) Inventors: Tatsuo Itabashi, Tokyo (JP); Satoru Matsuda, Tokyo (JP); Akihiko Kimura, Kanagawa (JP)

(73) Assignee: Sony Corporation, Tokyo (JP)

(*) Notice: Subject to any disclaimer, the term of this patent is extended or adjusted under 35 U.S.C. 154(b) by 2434 days.

(21) Appl. No.: 10/524,598

(22) PCT Filed: Aug. 13, 2003

(86) PCT No.: PCT/JP03/10287
§ 371 (c)(1),
(2), (4) Date: Feb. 14, 2005

(87) PCT Pub. No.: WO2004/017570
PCT Pub. Date: Feb. 26, 2004

(65) Prior Publication Data
US 2005/0262035 A1 Nov. 24, 2005

(30) Foreign Application Priority Data

Aug. 14, 2002 (JP) ............................... P2002-236251
Aug. 12, 2003 (JP) ............................... P2003-292587

(51) Int. Cl.
| G06F 12/00 | (2006.01) |
| G06F 17/30 | (2006.01) |
| H04L 12/28 | (2006.01) |
| H04L 29/06 | (2006.01) |
| H04L 29/12 | (2006.01) |
| H04L 29/08 | (2006.01) |

(52) U.S. Cl.
CPC ...... *H04L 29/12113* (2013.01); *H04L 12/2809* (2013.01); *H04L 29/06* (2013.01); *H04L 61/1541* (2013.01); *H04L 2012/2841* (2013.01); *H04L 67/18* (2013.01); *H04L 67/04* (2013.01); *H04L 69/329* (2013.01); *Y10S 707/99951* (2013.01)
USPC ......................... 707/821; 707/828; 707/999.2

(58) Field of Classification Search
USPC .............................. 707/104.1, 10, 100, 4, 101
See application file for complete search history.

(56) References Cited

U.S. PATENT DOCUMENTS 6,377,810 B1 * 4/2002 Geiger et al. .............. 455/456.2
6,874,017 B1 * 3/2005 Inoue et al. .................... 709/217
(Continued)

FOREIGN PATENT DOCUMENTS

| JP | 11-232193 | 8/1999 |
| JP | 2001-256156 | 9/2001 |

(Continued)

OTHER PUBLICATIONS

Richard, "Service Advertisement and Discovery: Enabling Universal Device Cooperation", Oct. 31, 2000, pp. 18-26.

(Continued)

*Primary Examiner* — Hosain Alam
*Assistant Examiner* — Azam Cheema
(74) *Attorney, Agent, or Firm* — K&L Gates LLP

(57) ABSTRACT

The present invention provides a configuration in which a service corresponding to a user can be provided by using an apparatus near the user, even when the user moves from one location to another and apparatuses near the user change. A mobile apparatus carried by the user forms cells, with the mobile apparatus itself being the master, collects information of nearby apparatuses from a space directory (SDR), which stores information of directly-accessible slaves or nearby apparatuses, and generates and updates mobile directory information in a storage unit based on the collected information. Accordingly, the user can obtain the information of nearby information processors unconsciously without performing a special process and, thus, the user can receive services, such as content distribution and communication services, by using the nearby apparatuses based on the obtained information.

20 Claims, 15 Drawing Sheets

(56) References Cited

U.S. PATENT DOCUMENTS

| | | | | |
|---|---|---|---|---|
| 2001/0047363 | A1* | 11/2001 | Peng | 707/104.1 |
| 2002/0151315 | A1* | 10/2002 | Hendrey | 455/466 |
| 2003/0028585 | A1* | 2/2003 | Yeager et al. | 709/201 |
| 2003/0061234 | A1* | 3/2003 | Ali et al. | 707/104.1 |

FOREIGN PATENT DOCUMENTS

| | | |
|---|---|---|
| JP | 2001-309445 | 11/2001 |
| JP | 2001-344163 | 12/2001 |
| JP | 2002-044749 | 2/2002 |
| JP | 2002-94546 | 3/2002 |
| JP | 2002-123444 | 4/2002 |
| WO | WO 01/62482 | 10/2000 |
| WO | WO 01/01632 A2 | 1/2001 |

OTHER PUBLICATIONS

Supplemental European Search Report, dated Jun. 9, 2010, for corresponding European Appln. No. 03788092.9.

* cited by examiner

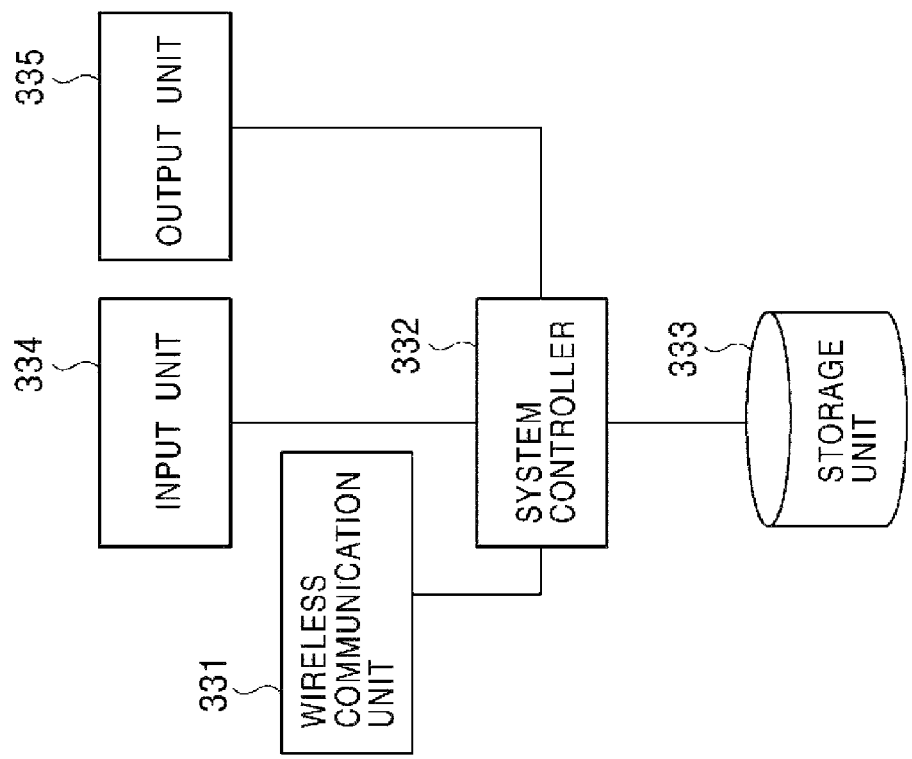
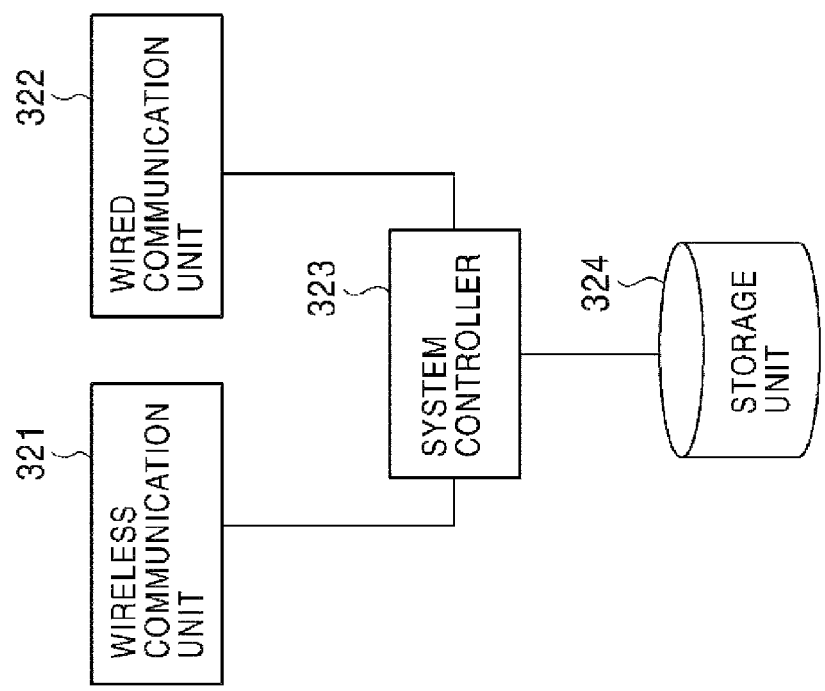
FIG. 4

FIG. 13

| SLAVE No. | SLAVE BD-ADDRESS | COMMUNICATION CONDITION OF PHYSICAL LAYER |
|---|---|---|
| 1 | 00-e3-24-81-b8-fb | INFORMATION REQUIRED FOR COMMUNICATION, SUCH AS FREQUENCY HOPPING INFORMATION AND POWER-SAVE CONDITION INCLUDED IN CLOCK INFORMATION EXTRACTED FROM FHS PACKET FROM EACH SLAVE |
| 2 | 00-e3-24-81-b8-fc | |
| 3 | 00-e3-24-81-b8-fd | |
| | | |
| | | |

INFORMATION PROCESSING DEVICE, DATA PROCESSING SYSTEM AND METHOD, AND COMPUTER PROGRAM

BACKGROUND OF THE INVENTION

The present invention relates to an information processor, a data communication system, a data communication method, and a computer program. More specifically, the present invention relates to an information processor, a data communication system, a data communication method, and a computer program, in which a user can receive various services such as distributed content or communication services through various information processors at a location away from home or office by using user information even when the user moves from one location to another, in a configuration where data communication services are received through various information processors which are close to the user and which have a communication unit.

In recent years, mobile personal computers and mobile phones have become widespread, and many users carry these compact apparatuses having a communicating function and an information-processing function so as to perform communication through a network outdoors or at a location away from home or office. In such a so-called mobile computing environment, nodes connected to a network so as to receive services, such as personal computers, are moved. In order to achieve continuous communication by using the mobile nodes, various techniques have been proposed.

However, when a user uses information processors other than mobile nodes, such as mobile phones, connected to a predetermined local area network, such as a home-LAN or in-house network, the user needs to input his/her registered information to each information processor so as to allow the information processor to perform processing by reflecting user information thereto.

Further, when a user receiving a communication service provided by a specific service provider (ISP-A) by using a mobile communication terminal moves to an area in which only another communication service provider (ISP-B) can provide a communication service, the user cannot receive a communication service.

As described above, under present circumstances, the user can comfortably receive services provided by a specific apparatus or a specific service provider. However, when the user moves to another place and uses another apparatus or tries to receive a service from another service provider other than the specific service provider, various disadvantages result.

Even within a specific service, since registered user information is collectively managed by the apparatus of a service provider, processing regarding the registered user information including authentication processing is centrally performed by the apparatus of the service provider. In such a system, network traffic jam or too much processing burden may be caused if registered users increase, and the processing speed may significantly decrease.

In addition, since the registered user information of the specific service is managed by the service provider, the users must entrust the management of their personal information to the service provider. However, leakage of the personal information of the registered users from the service provider to a third party actually occurs at times.

SUMMARY OF THE INVENTION

The present invention has been made in view of the foregoing problems, wherein the present invention seeks to provide an information processor, a data communication system, a data communication method, and a computer program, in which a user can use an apparatus other than his/her specific apparatus away from home in order to receive a service by using user information. Also the user can receive a communication service from a service provider other than a specific service provider based on the user information.

The present invention also seeks to provide an information processor, a data communication system, a data communication method, and a computer program, in which a user can use an apparatus other than his/her specific apparatus away from home in order to receive a service by using user information, concentration of processing for user information including user authentication can be avoided even if the users increase, so that a decrease in the service processing speed can be avoided, services can be used without entrusting the management of user information to a service provider, and leakage of personal information from the service provider to a third party can be prevented.

According to an embodiment of the present invention, a mobile information processor includes: a communication part for performing data communication with an external apparatus; a storage part for storing mobile directory information including information of nearby apparatuses; and a controller for collecting information of accessible nearby apparatuses and updating the mobile directory information stored in the storage part based on the collected information.

Further, in an embodiment of the mobile information processor of the present invention, the controller receives the information of the nearby apparatuses from a space directory (SDR) which stores the information of the nearby apparatuses, and updates the mobile directory information stored in the storage part.

Further, in an embodiment of the mobile information processor of the present invention, the controller receives the information of the nearby apparatuses from a space directory (SDR) which stores the information of the nearby apparatuses, while, in response to a transmission challenge from the space directory (SDR), the control means transmits encrypted data of the challenge created by its own secret key together with a public-key certificate to the space directory.

Further, in an embodiment of the mobile information processor of the present invention, the communication part perform Bluetooth wireless communication.

Further, in an embodiment of the mobile information processor of the present invention, the controller periodically collects the information of the accessible nearby apparatuses.

Further, in an embodiment of the mobile information processor of the present invention, the controller communicates with a personal directory (PDR) which stores original data of the mobile directory information through a communication relay included in the nearby apparatuses, and registers the position of the mobile information processor in the personal directory (PDR).

According to another embodiment of the present invention, an information processor includes: a communication part for performing data communication with an external apparatus; a storage part for storing original information of mobile directory information; and a controller for receiving a service request from the external apparatus through the communication part and providing at least part of the original information as mobile directory information to the external apparatus.

Further, in an embodiment of the information processor 15 of the present invention, the controller registers position information of the external apparatus.

According to another embodiment of the present invention, an information processor includes: a communication part for performing data communication with an external apparatus; a storage part for storing information of information processors in a local area; and a controller for receiving a service request from the external apparatus through the communication parts and providing a service to the external apparatus based on the information of the information processors.

Further, in an embodiment of the information processor of the present invention, the controller transmits the information of the information processors about nearby apparatuses stored in the storage part to the external apparatus.

Further, in an embodiment of the information processor of the present invention, before transmitting the information of the information processors about nearby apparatuses stored in the storage part to the external apparatus, the controller performs authentication processing by challenge response; that is, the controller performs challenge transmission and receives encrypted data of the challenge transmission created by a secret key of the external apparatus and a public-key certificate as a response from the external apparatus.

Further, in an embodiment of the information processor of the present invention, the communication part performs Bluetooth wireless communication.

According to another embodiment of the present invention, a data communication system includes: a mobile apparatus storing mobile directory information; and a personal directory (PDR) which stores original information of the mobile directory information and which receives a service request from the mobile apparatus through a network and provides a service to the mobile apparatus according to the service request.

Further, in an embodiment of the data communication system of the present invention, the data communication system further includes a service provider, and the service provider provides a service based on information obtained from the personal directory (PDR).

Further, in an embodiment of the data communication system of the present invention, the data communication system further includes a space directory server which stores information of information processors in a local area, and the space directory server receives a service request including information of nearby apparatuses included in the mobile directory information from the mobile apparatus and provides a service through the nearby apparatus.

Further, in an embodiment of the data communication system of the present invention, the service providing process is performed through a service provider.

According to another embodiment of the present invention, a method of obtaining information of nearby apparatuses by using a mobile information processor is provided. The method includes: a step of accessing a space directory (SDR) which stores the information of the nearby apparatuses; a step of transmitting, in response to a transmission challenge from the space directory (SDR), encrypted data of the challenge created by its own secret key together with a public-key certificate to the space directory; a step of receiving the information of the nearby apparatuses from the space directory (SDR); and a step of storing the received information in a storage part as mobile directory information.

Further, in an embodiment of the method of obtaining information of nearby apparatuses of the present invention, the method further includes a step of communicating with a personal directory (PDR) which stores original data of the mobile directory information so as to register position information of the mobile information processor in the personal directory (PDR).

According to another embodiment of the present invention, a data communication method includes: a step of obtaining information of nearby apparatuses as information of information processors in a local area and storing the obtained information in a storage part as mobile directory information, the step being performed by a mobile apparatus; and a step of transmitting a service request including the information of the nearby apparatuses included in the mobile directory information from the mobile apparatus to a personal directory (PDR), which stores original data of the mobile directory information, so that the personal directory provides a service through the nearby apparatus.

Further, in an embodiment of the data communication method of the present invention, the information of the nearby apparatuses is obtained from a space directory server (SDR) which stores the information of information processors as nearby apparatuses.

Further, in an embodiment of the data communication method of the present invention, the service request is transmitted through a service provider.

According to another embodiment of the present invention, a data communication method includes: a step of obtaining information of nearby apparatuses as information of information processors in a local area directly from the information processor and storing the obtained information in a storage part as mobile directory information, the step being performed by a mobile apparatus; and a step of receiving a service request including the information of the nearby apparatuses included in the mobile directory information from the mobile apparatus, the step being performed by a personal directory (PDR) which stores original data of the mobile directory information, so that the personal directory provides a service through the nearby apparatus.

Further, in an embodiment of the data communication method of the present invention, the service request is received through a service provider.

According to another embodiment of the present invention, a computer program for allowing a mobile information processor to execute a process of obtaining information of nearby apparatuses is provided. The process is performed in a computer system, and the program includes: a step of accessing a space directory (SDR) which stores the information of the nearby apparatuses; a step of transmitting, in response to a transmission challenge from the space directory (SDR), encrypted data of the challenge created by its own secret key together with a public-key certificate to the space directory; a step of receiving the information of the nearby apparatuses from the space directory (SDR); and a step of storing the received information in a storage part as mobile directory information.

According to another embodiment of the present invention, a computer program for allowing a mobile information processor to execute a process of obtaining information of nearby apparatuses is provided. The process is performed in a computer system, and the program includes: a step of accessing an information processor which stores apparatus information; a step of transmitting, in response to a transmission challenge from the information processor, encrypted data of the challenge created by its own secret key together with a public-key certificate to the information processor; a step of receiving the apparatus information from the information processor; and a step of storing the received information in a storage part as mobile directory information.

The computer program of the present invention can be provided via a storage medium or communication medium which provides the program to a general computer system capable of executing various program codes in a computer-readable manner, such as a storage medium including a CD, FD, or MO, or a communication medium including a network. By providing the program in a computer-readable manner, processing according to the program is executed in the computer system.

In the following description, a system refers to a logical set of a number of apparatuses, which are not necessarily in a same casing.

According to the configuration of the present invention, a mobile information processor or a mobile apparatus which can be carried by a user collects information of accessible nearby apparatuses from a space directory (SDR) storing the information of the nearby apparatuses, generates mobile directory information in a storage unit based on the collected information, and updates the information. Accordingly, the user can obtain the information about various information processors near the user unconsciously without performing a special process. Furthermore, the mobile apparatus can receive various information processing services, such as content distribution and communication services, by using the nearby apparatuses based on the obtained information.

Further, according to the configuration of the present invention, personal information can be stored in a number of apparatuses. That is, the original of the personal information can be stored in a PDR and part of the information can be stored in an MDR. Further, processing such as authentication is performed in different apparatuses for each user in a distributed manner. Therefore, the centralization of processing regarding personal information can be alleviated and a decrease in the processing speed can be prevented. Further, personal information is basically managed by a PDR in a user's own apparatus and a service provider need not manage the personal information. Therefore, leakage of personal information from the service provider can be prevented.

Additional features and advantages of the present invention are described in, and will be apparent from, the following Detailed Description of the Invention and the Figures.

BRIEF DESCRIPTION OF THE FIGURES

FIG. 4 includes block diagrams showing examples of the configuration of a locally-connected information processor.

FIG. 13 illustrates picocell information obtained in the picocell-forming processing using Bluetooth communication.

DETAILED DESCRIPTION OF THE INVENTION

Overview of the Present Invention

First, an overview of the information processor and the data communication system of the present invention will 10 be described with reference to the drawings.

Figure 1:
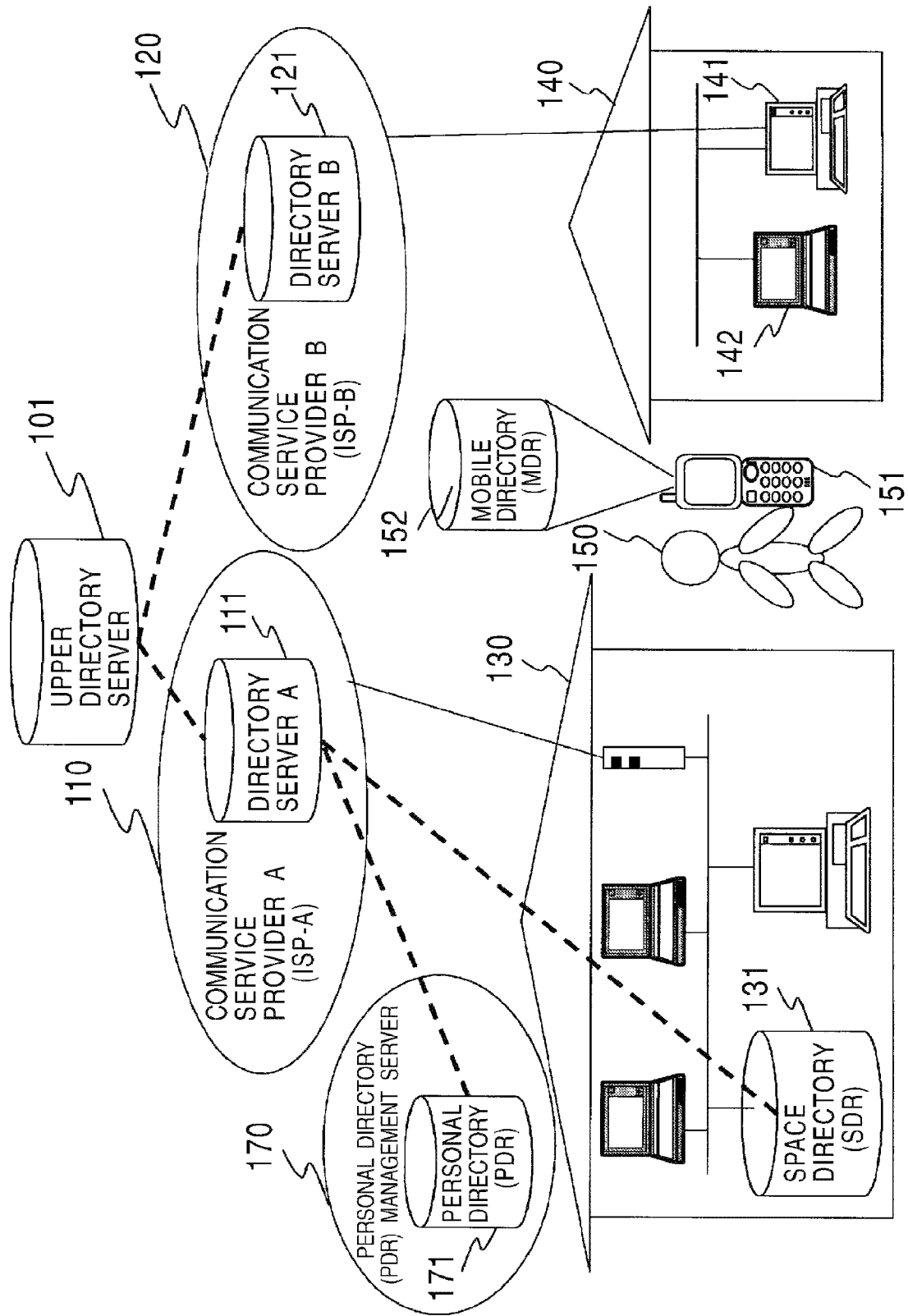
FIG. 1 shows an overview of a configuration of the present invention.

FIG. 1 illustrates an overview of the communication system to which the mobile information processor of the present invention can be applied. A user 150 uses various information processors connected to a local network, for example, a personal computer, a television set, and other information appliances in his/her home 130. These information appliances are connected to a specific communication service provider (ISP-A) 110 via a communication relay device, such as a router, so that various information can be transmitted to/from the information appliances via the communication service provider (ISP-A) 110.

A space directory (SDR) 131 in the user's home 130 stores information about locally-connected information 25 processors, the information including: information of various information processors such as PCs in the local area of the user's home 130, the ID and address of each information processor; information about processing which can be executed by each information processor; and setting information unique to the user set by the user 150.

The information about these locally-connected information processors is stored and held in a directory server-A 111 of the communication service provider (ISP-A) 110.

Likewise, various information processors 141 and 142 are connected to a local network at a location away from home 140, for example, someone's home other than the home of the user 150, a hotel, or an office. If a space directory also exists at the location away from home 140, the information of the various information processors as nearby apparatuses is stored in this space directory.

In the configuration of the present invention, however, a space directory for collecting and storing information of apparatuses is not necessary. Instead, the information of each information processor can be stored in the information processor itself, and the information can be transmitted to a mobile directory or a directory managed by a service provider as required. Each of the information processors 141 and 142, such as PCs, in the local area of the location away from home 140 stores information about the locally-connected information processors, such as the ID and address of each information processor; information of processing which can be executed by each information processor; and setting information unique to the user set by the user 150, in its own storage unit, and is also capable of outputting the information by communication.

The information about the information processors 141 and 142 is stored and held in a directory server-B 121 of a communication service provider (ISP-B) 120.

An upper directory server 101 serves as a medium of the information stored in the directory server-A 111 of the communication service provider (ISP-A) 110 and the information stored in the directory server-B 121 of the communication service provider (ISP-B) 120. For example, when the user moves from the user's home 130 to the location away from home 140 and uses a PC, a television set, or an information appliance connected to the local network of the location away from home 140, the user loads the information stored in the space directory (SDR) 131 in the user's home 130 to the information processor at the location away from home 140 through the directory server-A 111 of the communication service provider (ISP-A) 110, the upper directory server 101, and the directory server-B 121 of the communication service provider (ISP-B) 120. Accordingly, the user can allow the information processor to execute processing by reflecting setting information unique to the user.

The user 150 carries a mobile apparatus 151 serving as a mobile information processor. The information of a mobile directory 152 is stored in the mobile apparatus 151. The mobile directory information includes information unique to the user 150 and at least part of information-appliance information stored in the space directory (SDR) 131 in the user's home 130. The mobile apparatus 151 transmits/receives data to/from the space directory (SDR) 131 through the interface of a LAN-connected communication apparatus, obtains necessary data from the space directory (SDR) 131, and writes the obtained data therein as its own mobile directory information. This data communication processing is performed either in a wired manner, or wirelessly using Bluetooth or the like.

A personal directory (PDR) included in a personal directory (PDR) management server 170 manages the original of various mobile directory information held by a number of users. The personal directory stores the same information as the mobile directory information stored in the mobile apparatus 151 of each user, and provides information to each apparatus via the directory server of a service provider as required.

The user 150 carrying the mobile apparatus 151 serving as a mobile information processor directly communicates with the information processors 141 and 142, which are PCs or information appliances, at the location away from home 140, where a space directory (SDR) does not exist. Accordingly, the user 150 obtains information about information processors stored in the information processors 141 and 142 and writes the obtained information therein as its own mobile directory information. This data communication processing is performed either in a wired manner, or wirelessly using Bluetooth or the like.

Figure 2:
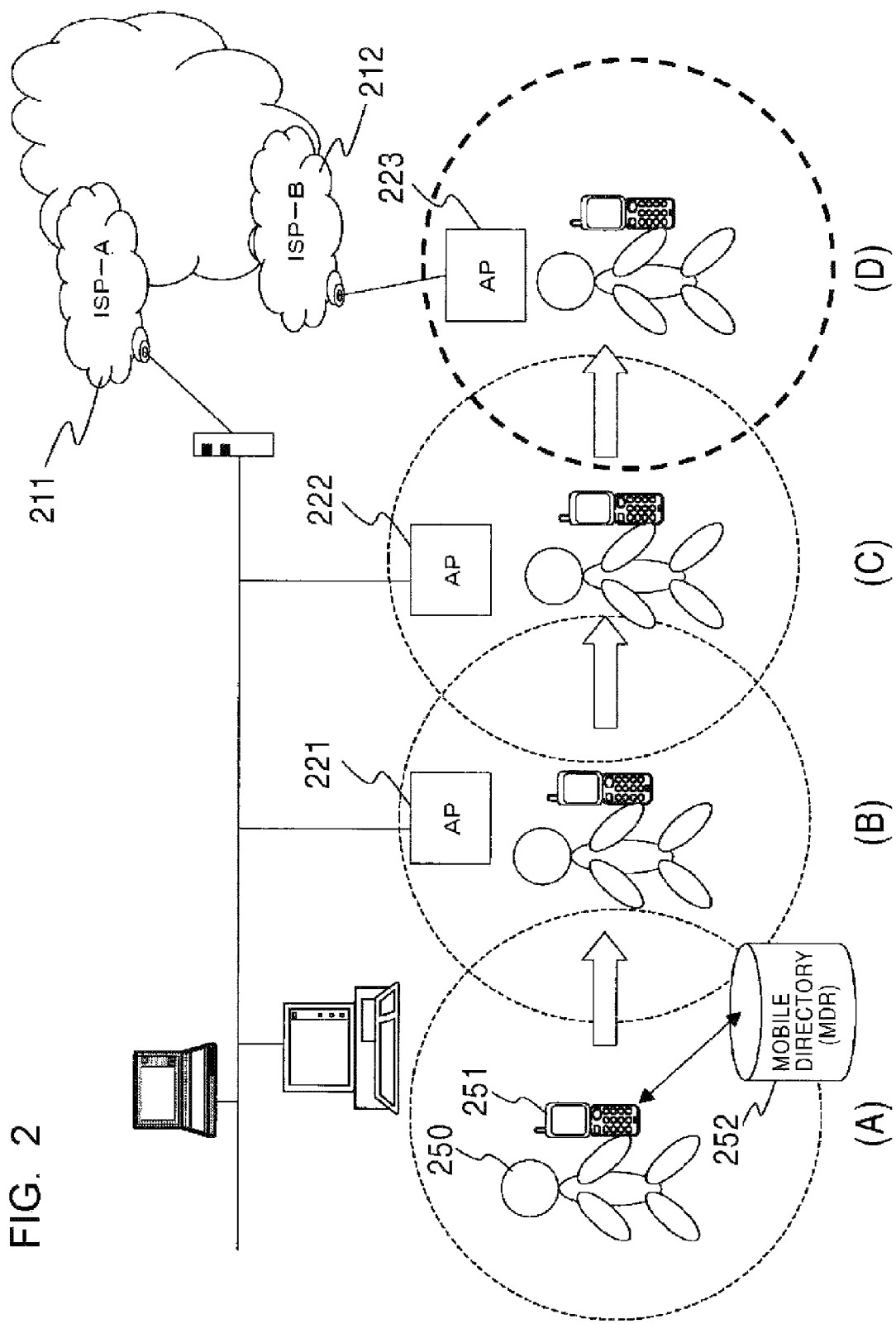
FIG. 2 shows an overview of another configuration of the present invention.

FIG. 2 illustrates an example of an application of the present invention in an environment where a user 250 performs communication by using a mobile information processor 251, serving as a communication terminal such as a mobile phone, while moving.

As in the configuration shown in FIG. 1, the information of a mobile directory 252 is stored in the information processor 251 carried by the user 250. The mobile directory information includes information unique to the user 250 and at least part of information-appliance information stored in the space directory (SDR) in the user's home.

When the user 250 moves within communication service providing areas (A) to (C) of a service provider (ISP-A) 211, 25 which the user usually uses, the user can perform communication via an access point (AP) 221 or 222. However, if the user 250 moves from area (C) to area (D), the user cannot access any access point (AP) of the service provider (ISP-A) 211. However, an access point (AP) 223 of another service provider (ISP-B) 212 exists in area (D).

In this case, the information processor 251 carried by the user 250 broadcasts user information including an access request. Accordingly, the service provider (ISP-B) 212 determines whether or not a service can be provided based on the user information, and provides a communication service if it is determined that the service can be provided. The determination is performed, for example, by verifying the user information received from the information processor 251 carried by the user 250 against the information received from a directory server A of the service provider (ISP-A) 211, the verification being performed by the service provider (ISP-B) 212.

As described above, in the configuration of the present invention, a user moves while carrying a mobile apparatus having a mobile directory (MDR), which stores user information and information about locally-connected information processors, such as information appliances, in the user's home. Accordingly, the user can perform communication via an information processor or an access point at home or at a location away from home, whereby the user can allow the information processor at the location away from home to execute processing by reflecting information unique to the user. Further, the user can receive services provided by various communication service providers (ISP).

Configuration of Information Processor and Server

Now, an example of the configuration of the mobile apparatus serving as a mobile information processor storing a mobile directory (MDR) carried by the user, and the hardware structure of the information processors connected to the local area of the user's home or at a location away from home, such as PCs and information appliances, will be described.

Figure 3:
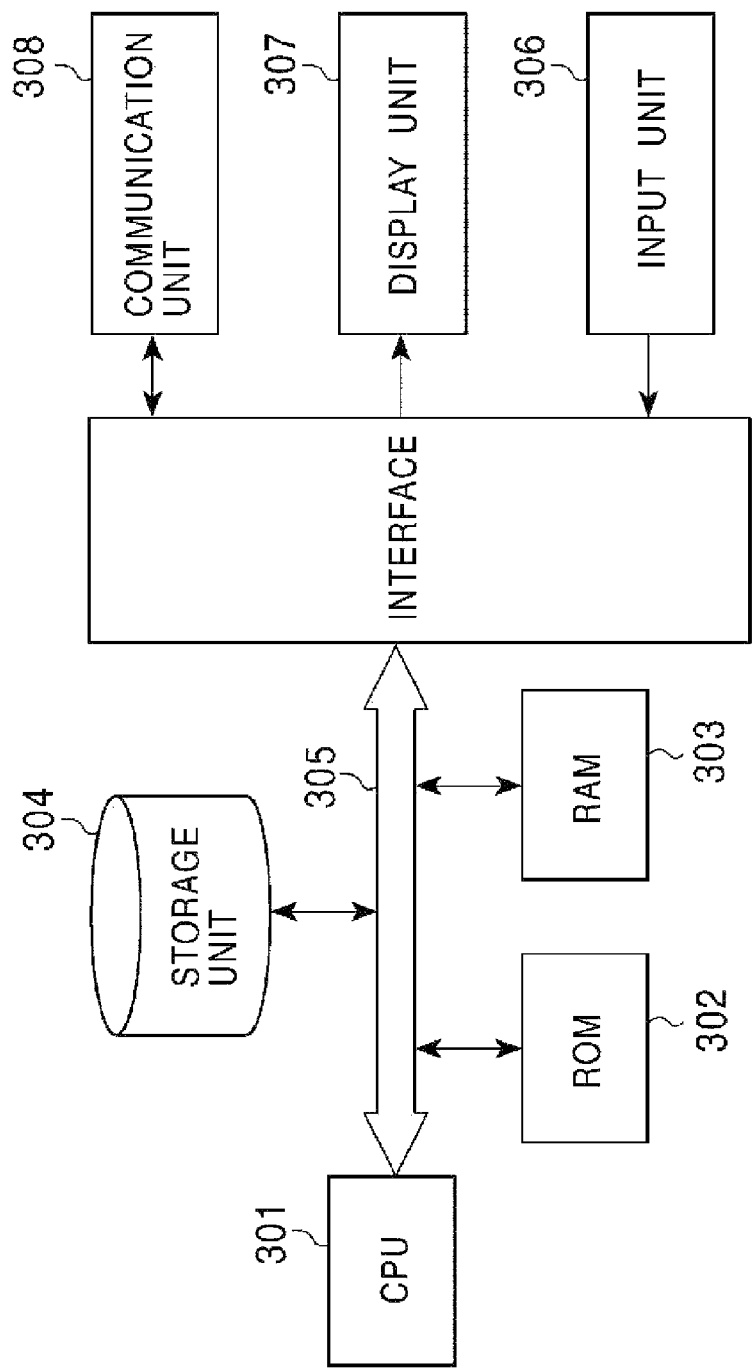
FIG. 3 is a block diagram of the configuration of a mobile apparatus.

First, the configuration of the mobile apparatus will be described with reference to FIG. 3.

A central processing unit (CPU) 351 is a processor which functions as a control unit and executes various programs. A read-only-memory (ROM) 302 stores the programs executed by the CPU 301 and fixed data as operation parameters. A random access memory (RAM) 303 is used as a storage area and a work area for the programs executed by the CPU 301 and parameters which change as required during the program processing.

A storage unit 304 is a hard disk or flash memory, for example, and stores the above-described mobile directory information and so on. Part of the mobile directory information may be stored in the ROM 302 or the RAM 303. A bus 305 includes a peripheral component Internet/Interface (PCI) bus or the like, which enables data transfer to each module or each input/output device via an input/output interface.

An input unit 306 includes, for example, various input switches, buttons, a keyboard, and a pointing device. When the input unit 306 is operated through the various input switches or the like, or when data is received from a communication unit 308, a command is input to the CPU 301, which executes a program stored in the ROM 302. A display unit 307 includes, for example, a CRT or a liquid crystal display, and displays various information in a form of text or images.

The communication unit 308 performs wireless communication by using Bluetooth or the like. Bluetooth is a close-range wireless data communication technique replacing cable communication or infrared data association (IrDA), which is an infrared communication technique, and performs transmission/reception of data and voice information in an industrial scientific medical (ISM) band of 2.45 GHz. Also, seven slaves are provided for a master, the transmission speed is 721 Kbps, and the output is 0 to 20 dBm, which achieves low power consumption. Also, high frequencies are adopted in a frequency hopping spread spectrum method, in which communication is performed by constantly hopping the frequency in the transmitter side and the receiver side (by changing positions). Accordingly, Bluetooth is characterized in that directivity is not restricted in transmission/reception of data and voice between the transmitter side and the receiver side.

Next, examples of the hardware structure of the information processors connected in the local area of the user's home or a location away from home, such as a PC, a television set, and other information appliances, will be described with reference to FIG. 4.

The locally-connected information processors include a PC, a television set, a printer, a telephone, etc., each having a corresponding structure. Two examples (a) and (b) of the structure are shown in FIG. 4.

The configuration shown in (a) includes a system controller 323 for executing various control operations corresponding to the apparatus. Specifically, the system controller 323 includes a control unit such as a CPU and a storage unit such as a ROM and a RAM. Alternatively, the system controller 323 includes a dedicated processor or the like for executing processing peculiar to the apparatus. A storage unit 324 stores an apparatus ID serving as the identifier of the apparatus and address information required for communication processing. Also, the storage unit 324 stores various information of apparatuses, such as user setting information, which is to be supplied to the space directory (SDR) described with reference to FIG. 1. The stored information is output to the SDR as required and is stored in the SDR as space directory information.

The configuration shown in (a) also includes a wireless communication unit 321 and a wired communication unit 322 so as to perform wireless communication, such as the above-described Bluetooth communication or infrared communication, or wired communication to a LAN or the like. With this configuration, communication can be performed with another apparatus or via a network by using each communication unit.

FIG. 4 (b) shows another example of the configuration of an information processor as a locally-connected apparatus, which is different from FIG. 4 (a). The information processor shown in (b) includes a control unit such as a CPU and a storage unit such as a ROM and a RAM. Also, the information processor includes a system controller 332 which includes a dedicated processor or the like for executing processing peculiar to the apparatus and which performs various control operations corresponding to the apparatus. A storage unit 333 stores an apparatus ID serving as the identifier of the apparatus and address information required for communication processing. Also, the storage unit 333 stores various apparatus information, such as user setting information, which is to be supplied to the space directory (SDR) described with reference to FIG. 1. The stored information is output to the SDR as required and is stored in the SDR as space directory information.

Also, the configuration shown in FIG. 4 (b) includes a wireless communication unit 331 for performing wireless communication such as the above-described Bluetooth or infrared communication. Further, an input unit 334 including switches, a keyboard, and a mouse, and an output unit 335 including a display or a speaker are provided.

Two examples (a) and (b) of the configuration of the information processor are shown in FIG. 4. However, various apparatuses are locally connected, and each of the apparatuses has a corresponding hardware structure. Each apparatus includes at least a storage unit for storing information to be provided to the space directory or the mobile directory and a communication processing function for outputting the information to the SDR.

Figure 5:
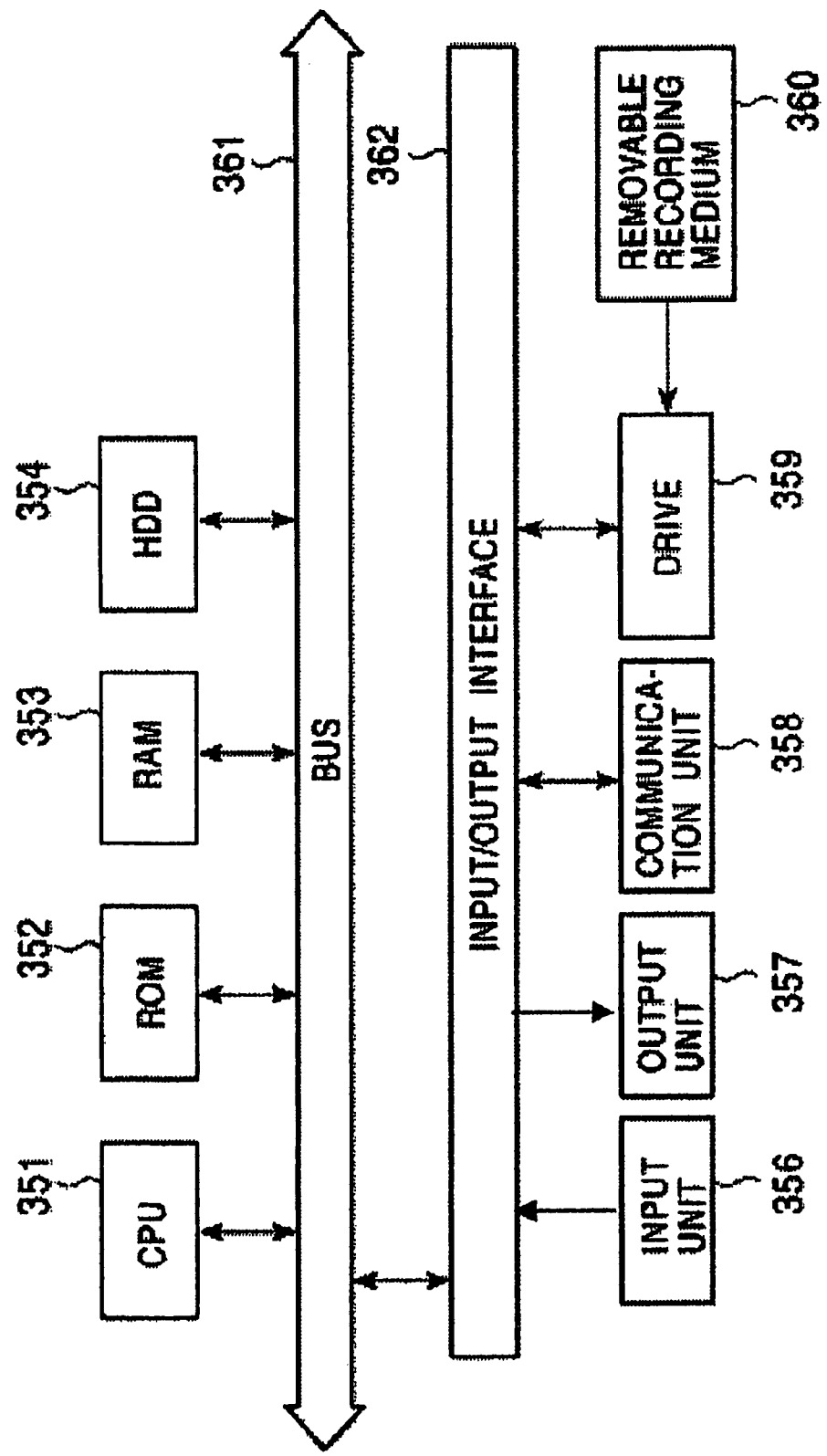
FIG. 5 shows the configuration of each server.

Hereinafter, an example of the configuration of the space directory shown in FIG. 1, the directory server of each communication service provider, the personal directory server, and the upper directory server will be described with reference to FIG. 5. The configuration shown in FIG. 5 is only an example, and each server does not necessarily have all the functions shown herein.

A central processing unit (CPU) 351 is a processor which functions as a control unit and which executes various programs. A read-only-memory (ROM) 352 stores the programs executed by the CPU 351 and fixed data as operation parameters. A random access memory (RAM) 353 is used as a storage area and a work area for the programs executed by the CPU 501 and parameters which change as required during program processing.

An HDD 354 controls a hard disk and performs processing of storing/reading various data and programs in/from the hard disk. A bus 361 includes a peripheral component Internet/Interface (PCI) bus or the like, which enables data transfer to each module and each input/output device via an input/output interface 362.

An input unit 356 includes, for example, various input buttons, a keyboard, and a pointing device. When the input unit 356 is operated through the keyboard or the mouse, or when data is received from a communication unit 358, a command is input to the CPU 351 so that the CPU 351 executes the program stored in the ROM 352. An output unit 357 includes, for example, a CRT or a liquid crystal display, which displays various information in the form of text or images.

The communication unit 358 performs communication with various apparatuses. Specifically, the communication unit 358 transmits data supplied from each storage unit or data processed by the CPU 351 and receives data from other apparatuses under the control of the CPU 351.

A drive 359 records/plays back data in/from a removable recording medium 360, such as a flexible disk, a compact disk read only memory (CD-ROM), a magneto optical (MO) disk, a digital versatile disk (DVD), a magnetic disk, or a semiconductor memory. Also, the drive 359 plays back a program or data from the removable recording medium 360 and stores a program or data in the removable recording medium 360.

When a program or data recorded in the recording medium is read and is executed or processed by the CPU 351, the read program or data is supplied to the connected RAM 353, for example, via the input/output interface 362 and the bus 361. Then, the CPU 351 executes various processes in accordance with the program set in the RAM 353.

Mobile Directory (MDR)

Next, the data structure of the mobile directory (MDR) will be described with reference to FIG. 6. The mobile directory (MDR) is information which is stored in the mobile apparatus 151 (see FIG. 1) carried by the user.

Figure 6:
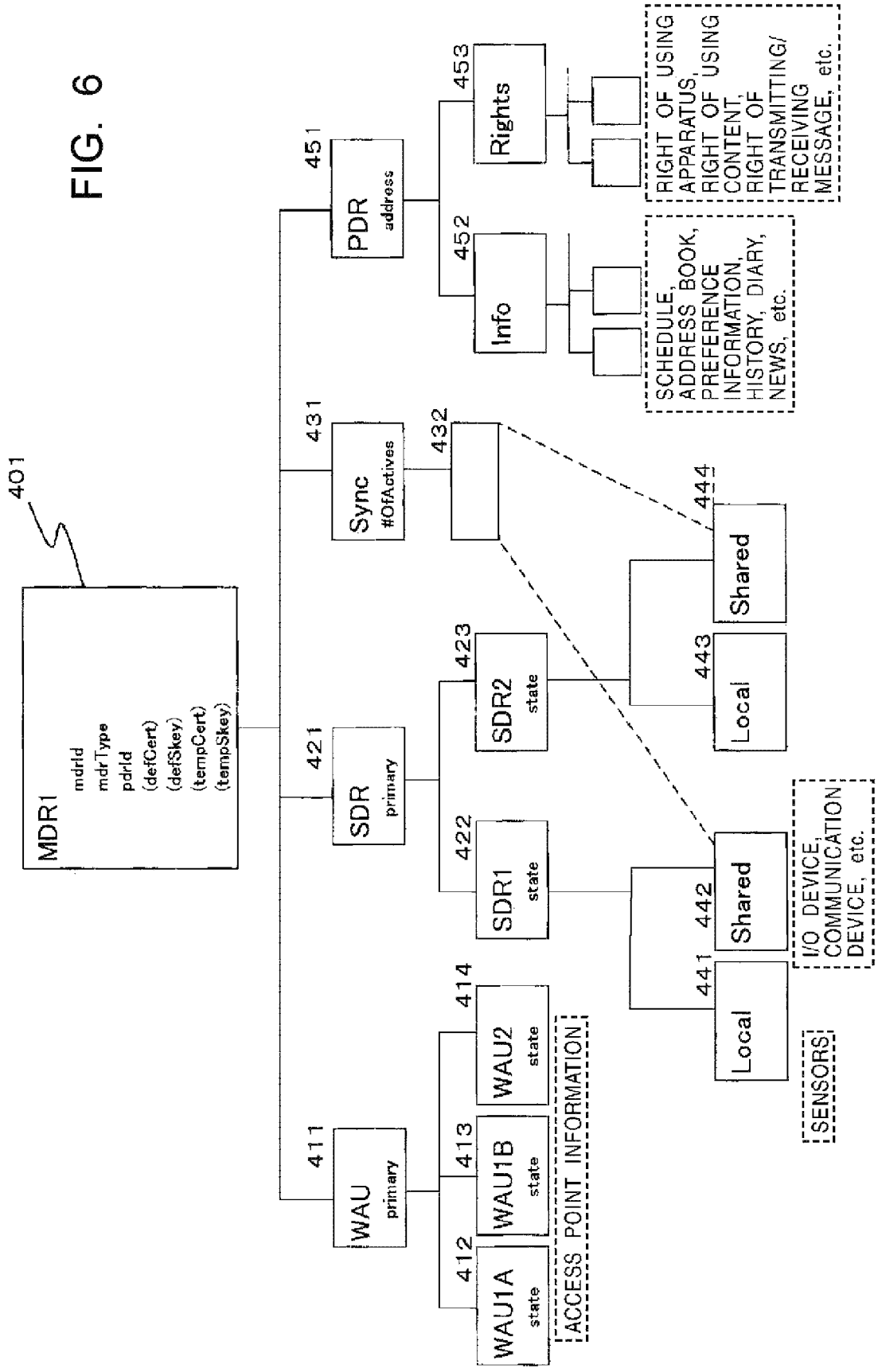
FIG. 6 shows the structure of a mobile directory.
Figure 7:
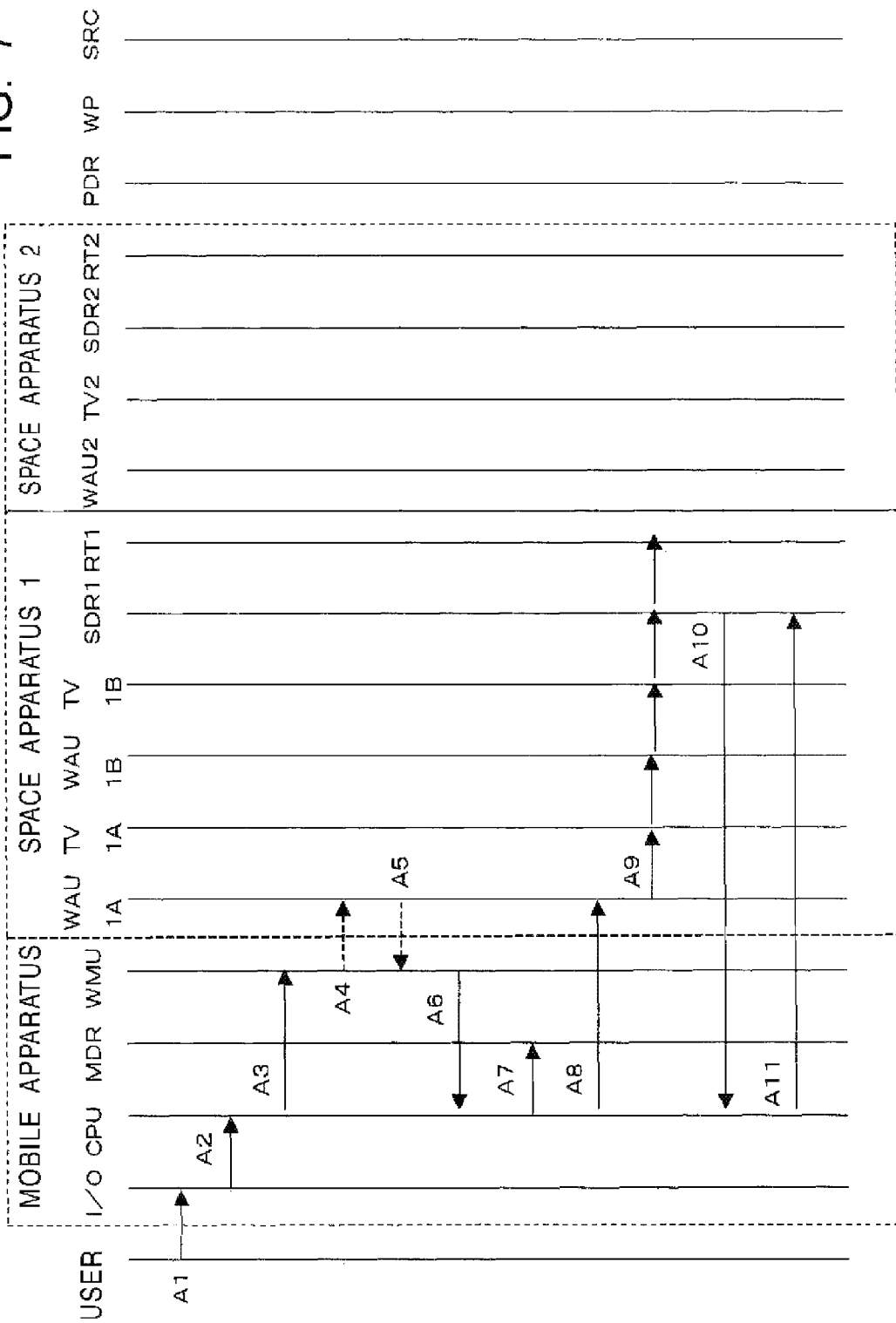
FIG. 7 shows a processing sequence performed by using the mobile apparatus.

FIG. 6 shows the data structure of the mobile directory (MDR) in a form of a directory tree. An MDR1 401 is basic information corresponding to the mobile directory (MDR) stored in the mobile apparatus and includes an MDR identifier (mdrId), an MDR type (mdrType), a personal directory (PDR) identifier (pdrId) storing the original information of its own mobile directory (MDR), a default public-key certificate (defCert), a default secret-key (defSkey), a temporary public-key certificate (tempCert), and a temporary secret-key (tempSkey).

Further, primary wireless access unit information (WAUprimary) 411 as primary access point information, and state wireless access unit information (WAUstate) 412, 413, and 414 as access point information which is set according to the state of the apparatus, are set as access point information. Also, a primary space directory (SDRprimary) 421, and state space directories (SDRstate) 422 and 423 as space directory information which is set according to the state of the apparatus, are set as space directory information. Further, information of the specific form and communication processing form (Local and Shared) 441 to 444 of the space directory (SDR), and synchronization information (Sync) 431 and 432 are set.

Further, address information of the personal directory 25 (PDRaddress) 451, the personal directory (PDR) storing the original information of its own mobile directory (MDR), and user information (Info) 452 and user's right information (Rights) 453 stored in the personal directory (PDR) are stored.

The user information (Info) includes the schedule, address book, preference information, history, diary, and news of the user. Also, the user's right information (Rights) includes information of a right of using apparatus, a right of using content, and a right of transmitting/receiving a message.

The mobile directory information stored in the mobile apparatus carried by the user includes the above-described information, and the data is updated as required. When the user carrying the mobile apparatus uses a locally-connected apparatus at home or at a location away from home, a management entity managing the local apparatus to be used, such as a service provider, the SDR, or the apparatus itself identifies the user based on the mobile directory information stored in the mobile apparatus and, if necessary, obtains the user setting information and so on from the mobile directory or the personal directory (PDR) so as to perform setting corresponding to the user. Then, a state where processing corresponding to the user can be performed is set and various information processing for the apparatus are performed.

Also, when the mobile apparatus is used as a communication terminal such as a mobile phone, user information is input from the user's mobile apparatus via each access point set by a service provider so as to identify the user. Then, it is determined whether or not communication using the access point can be permitted. If permission can be given, a communication service is provided via the access point.

Example of Processing Sequence

Next, an example of a sequence of various processing performed by the user carrying the mobile apparatus storing the above-described mobile directory will be described with reference to sequence diagrams shown in FIGS. 7 to 11.

In the sequence diagrams shown in FIGS. 7 to 11, the following elements are shown from the left: a user; a mobile apparatus; space apparatuses 1 and 2 as a group of locally-connected information processors; a personal directory (PDR); a white page (WP) serving as a directory provided by a service provider; and a source (SRC) serving as a source of various information.

The mobile apparatus includes an input/output unit (I/O) such as switches, buttons, and a display; a CPU serving as a control unit; a mobile directory (MDR); and a wireless master unit (WMU) serving as a wireless communication unit for Bluetooth or the like.

The space apparatus 1 in an output unit includes TV1A and TV1B, which are locally-connected information processors. The TV1A and TV1B include wireless access units (WAU1A and WAU1B) functioning as communication units for communicating with the mobile apparatus, respectively. Further, the space apparatus 1 includes a space directory (SDR1) and a router (RT1) serving as a communication unit for an external network.

The space apparatus 2 in the output unit includes a TV2, which is a locally-connected information processor. The TV2 includes a communication unit (WAU2) functioning as a communication unit for communicating with the mobile apparatus. Further, the space apparatus 2 includes a space directory (SDR2) and a router (RT2) serving as a communication unit for an external network.

Steps A1 to A48 shown in the figures can be roughly grouped as follows.

Steps A1 to A18

A sequence of turning on an initialized terminal after purchase and starting use of the day.

a. First, picocells are formed: finds the space directory 25 SDR1 which manages the WAU1A on the picocells.

b. Obtains information managed by the SDR1 (authentication can be optionally performed).

c. Registers its own position and environment information in the PDR via the router.

d. Information at the initialization can be downloaded from the PDR.

Steps A19 to A21

Periodical update of picocell information (The need of 10 processing thereafter is determined by the CPU).

Steps A23 to A31

Processing performed when the user moves and the second WAU1B managed by the same SDR is found.

Steps A33 to A48

Processing performed when the user moves and the third WAU managed by another SDR is found.

a. Finds the space directory SDR2 which manages the WAU2 on 20 the picocells.

b. Obtains information managed by the SDR2 (authentication can be optionally performed). Herein, the CPU determines the conditions of two infrastructures so as to determine change of default router.

c. Updates its own position and environment information to the PDR via the router (the WAU1 still may be used for communication and, thus, information of the SDR1 is continuously held in the PDR).

d. Residual information can be downloaded from the PDR (more 5 urgent information is asynchronously notified by a PUSH function, which will be described later).

Hereinafter, each step will be described in detail.

(A1) Switch-On of the Mobile Apparatus

First, the user switches on the mobile apparatus. When the mobile apparatus is purchased, a mobile directory identifier (mdrId) and a mobile directory type (mdrType) are stored in the storage unit thereof. Further, at an initializing operation after the purchase, the identifier (pdrId) and the address (PDR address) of the personal directory (PDR) which manages the original of the mobile directory are written. Herein, such mobile apparatus already has been initialized and, thus, the identifier (pdrId) and the address (PDR address) of the personal directory (PDR) have been stored in the mobile apparatus.

(A2) Initialization of CPU

When the mobile apparatus is switched on, initialization of the mobile apparatus is performed. That is, an initial execution program is loaded and a processing-25 starting screen is displayed in the display unit.

(A3) Initialization of Wireless Master Unit (WMU)

Next, the wireless master unit (WMU) serving as a communication interface of the mobile apparatus is initialized. The wireless master unit (WMU) is a simple communication apparatus and performs only processing defined in a standard (for example, Bluetooth). Hereinafter, it is assumed that the mobile apparatus communicates with a nearby apparatus by using Bluetooth.

(A4) Search for Cells

The wireless master unit (WMU) starts to form picocells, with the WMU itself being the master. Search for picocells is performed as search for apparatuses which can communicate with the mobile apparatus.

Response from Wireless Access Unit (WAU1A)

At this time, only the wireless access unit (WAU1A) included in the space apparatus 1 is within the reach of radio waves, and thus can participate in formation of picocells.

(A6) Report of Cell State

The wireless master unit (WMU) in the mobile apparatus interrupts the CPU in synchronization with the update of the picocell state, and the result is reported.

(A7) Update of Mobile Directory (MDR)

The wireless access unit (WAU) field of the mobile directory (MDR) is updated. That is, the wireless access unit (WAU1A) found by cell search is registered.

Figure 12:
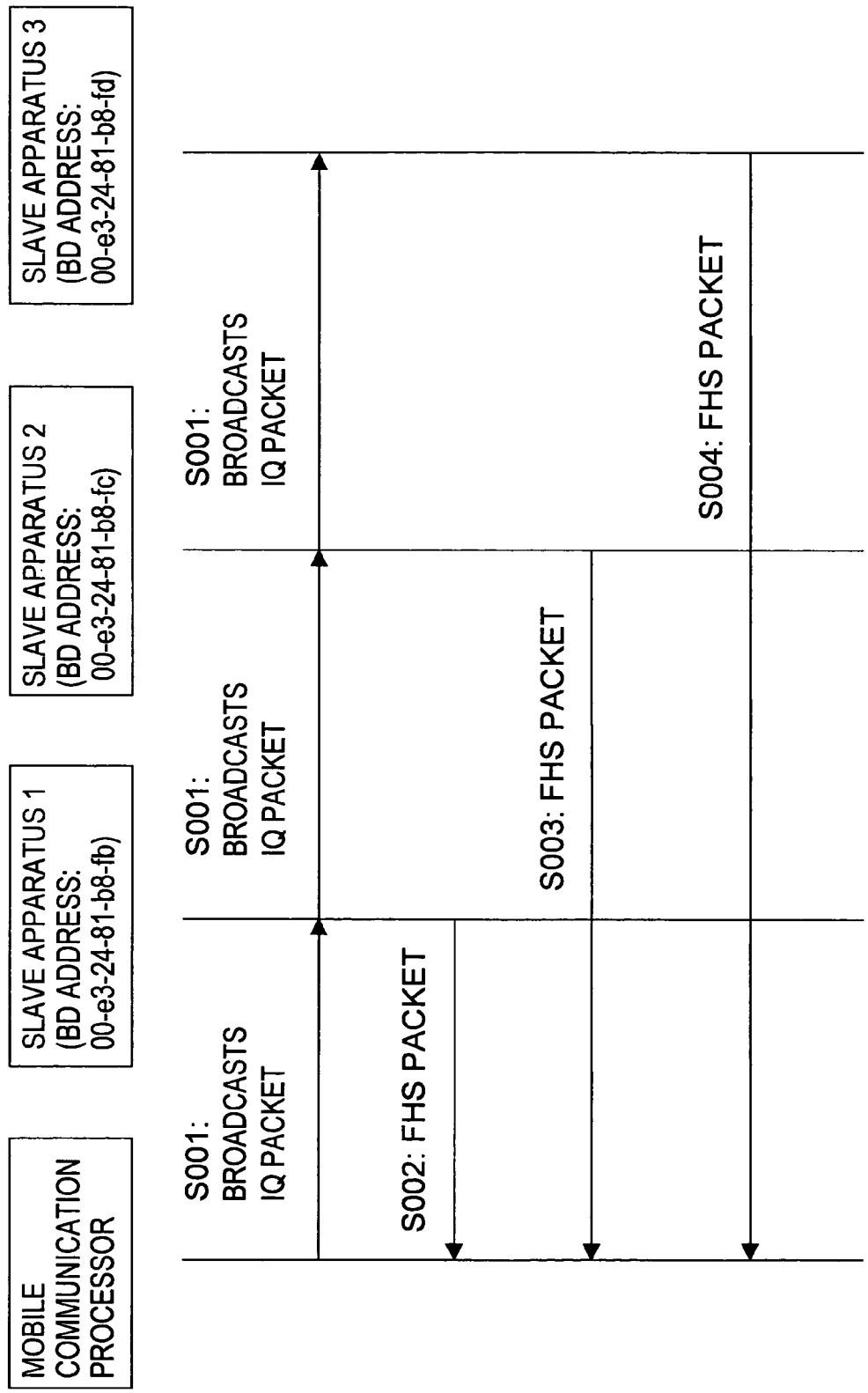
FIG. 12 illustrates a picocell-forming processing sequence using Bluetooth communication.

The above-described processing of forming picocells and registering the wireless access unit (WAU1A) can be executed based on a piconet setting process based on Bluetooth communication. Hereinafter, the piconet setting process based on Bluetooth communication will be described with reference to FIG. 12.

First, in step S001, a mobile communication processor as a slave broadcasts an inquiry. The broadcasting of the inquiry is basically performed by a master as a first step for checking the existence of nearby slaves and establishing the synchronization inside the piconet. However, at this point of time, the mobile communication processor as a slave does not know whether or not the master exists in the piconet, so that the mobile communication processor broadcasts an inquiry (IQ) packet as a provisional master.

In step S002, each slave apparatus which has received the IQ packet transmits its own attribute information (FHS packet) including its address (Bluetooth device address: BD-address) and clock information which enables synchronized communication between the master and slaves to the mobile communication processor.

The mobile communication processor extracts the BD-address and Bluetooth clock information of each slave apparatus from the received FHS packets.

The mobile communication processor stores picocell information as shown in FIG. 13 in the memory thereof, based on the received FHS packets from the slaves. That is, the mobile communication processor stores, in the memory thereof, the slave No. as the identifier of each slave; BD-address of each slave; and information required for communication, such as frequency hopping information and power-save condition included in clock information extracted from the FHS packet from each slave, as picocell information.

In the piconet, each of the master and slaves performing communication through Bluetooth has a clock (Bluetooth clock), and each slave must match its own clock with the clock (Bluetooth clock) of the master. This processing is performed by paging. Specifically, the paging consists of three phases: page transmission, page scanning, and page response. By performing the paging, the clocks of the master and slaves can be matched, so that the synchronization is established.

Hereinafter, the sequence of paging will be described with reference to FIG. 14. The paging is executed in accordance with the following sequence.

Figure 14:
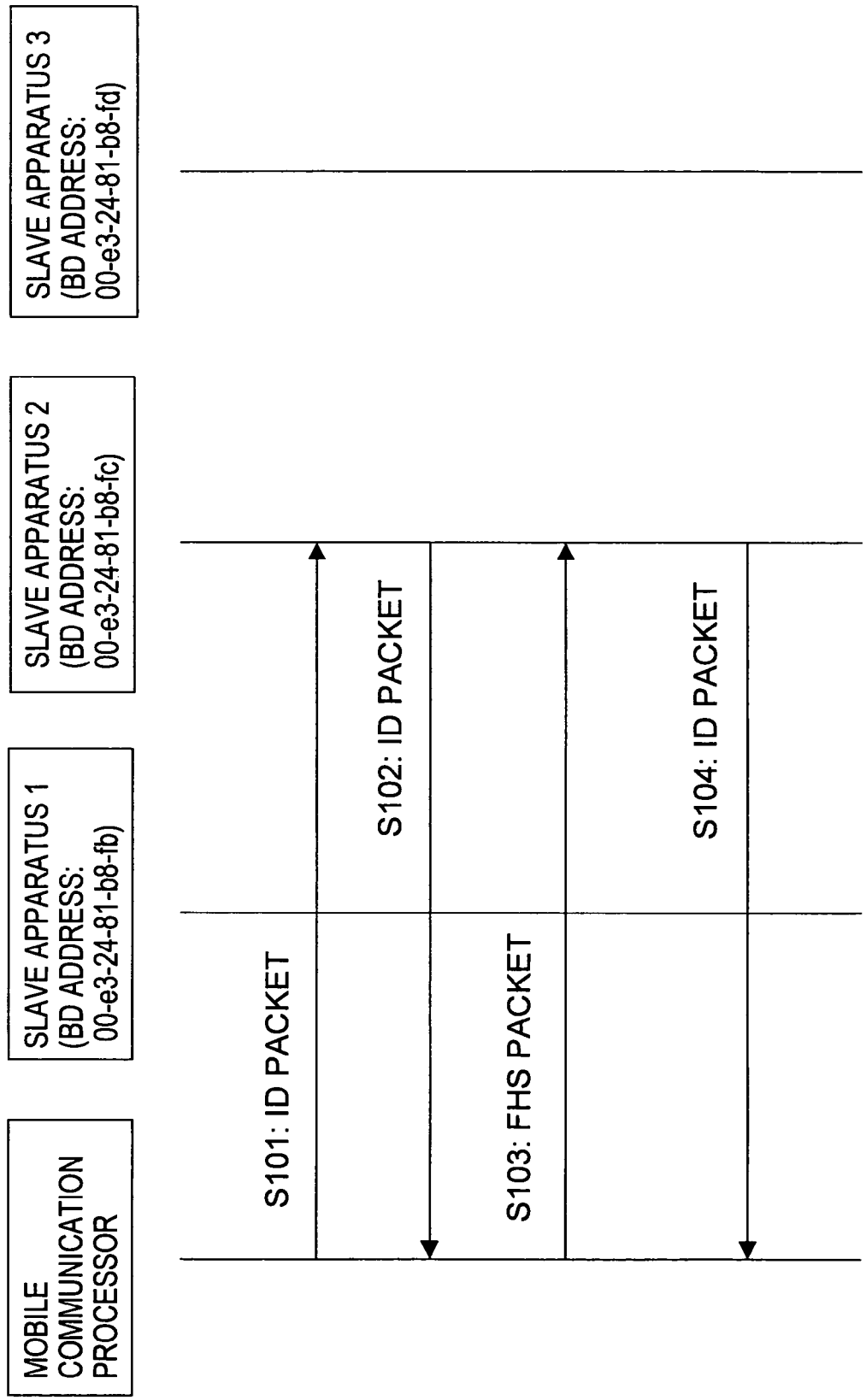
FIG. 14 illustrates a paging sequence in picocells set by the Bluetooth communication.

(1) The mobile communication processor as the master transmits an ID packet to a selected specific slave (slave apparatus 2 in FIG. 14). (S101)

(2) The slave apparatus 2 receives the ID packet from the master and transmits an ID packet to the master as acknowledgement. (S102)

(3) The master receives the ID packet from the slave and transmits an FHS packet to the slave. (S103)

(4) The slave extracts a BD address and Bluetooth clock information from the FHS packet from the master.

(5) The slave matches its own clock with the Bluetooth clock of the master in order to synchronize with the master.

(6) The slave transmits the ID packet again to the master as acknowledgement of the FHS packet. (S104)

(7) The master and slave switch a frequency hopping pattern to a channel frequency hopping pattern.

(8) The master and slave transfer to a communication phase.

By performing the above-described processing, picocells are formed and the wireless access unit (WAU1A) is registered. Now, referring back to FIG. 7, the processing sequence of various processing performed by the user carrying the mobile apparatus storing the mobile directory is continued.

(A8) Search for Space Directory (SDR) Via the Wireless Access Unit (WAU1A)

SDR-search instructions are transmitted to a wired network interface (NIC) of the wireless access unit (WAU1A) by using broadcast addresses and by designating a UDP fixed port.

(A9) Broadcasting to Segments by Wireless Access Unit (WAU1A)

Instructions of searching for SDR are broadcasted to wired segments from the WAU1A. The network of the same segment is managed by one type of space directory (SDR).

(A10) Response from Space Directory (SDR)

A space directory (SDR1) on the segment transmits "SID1, defRT1, and tempID-1 (challenge)." A number of SDRs may exist in one segment. In that case, however, the SDRs need to have the same identifier and store the same information.

(A11) Request for space information

"SID1 and tempID-1" obtained from the space directory (SDR1) in step (A10) is transmitted to the space directory (SDR1), as additional information. When a challenge is transmitted from the space directory (SDR), the mobile apparatus responses thereto (that is, encrypts the challenge with its own default secret key (defSkey)), and transmits the encrypted challenge together with a default public-key certificate (defCert) to the space directory (SDR). This method is applied for authenticating the party at the other end in communication (challenge-response authentication).

Figure 8:
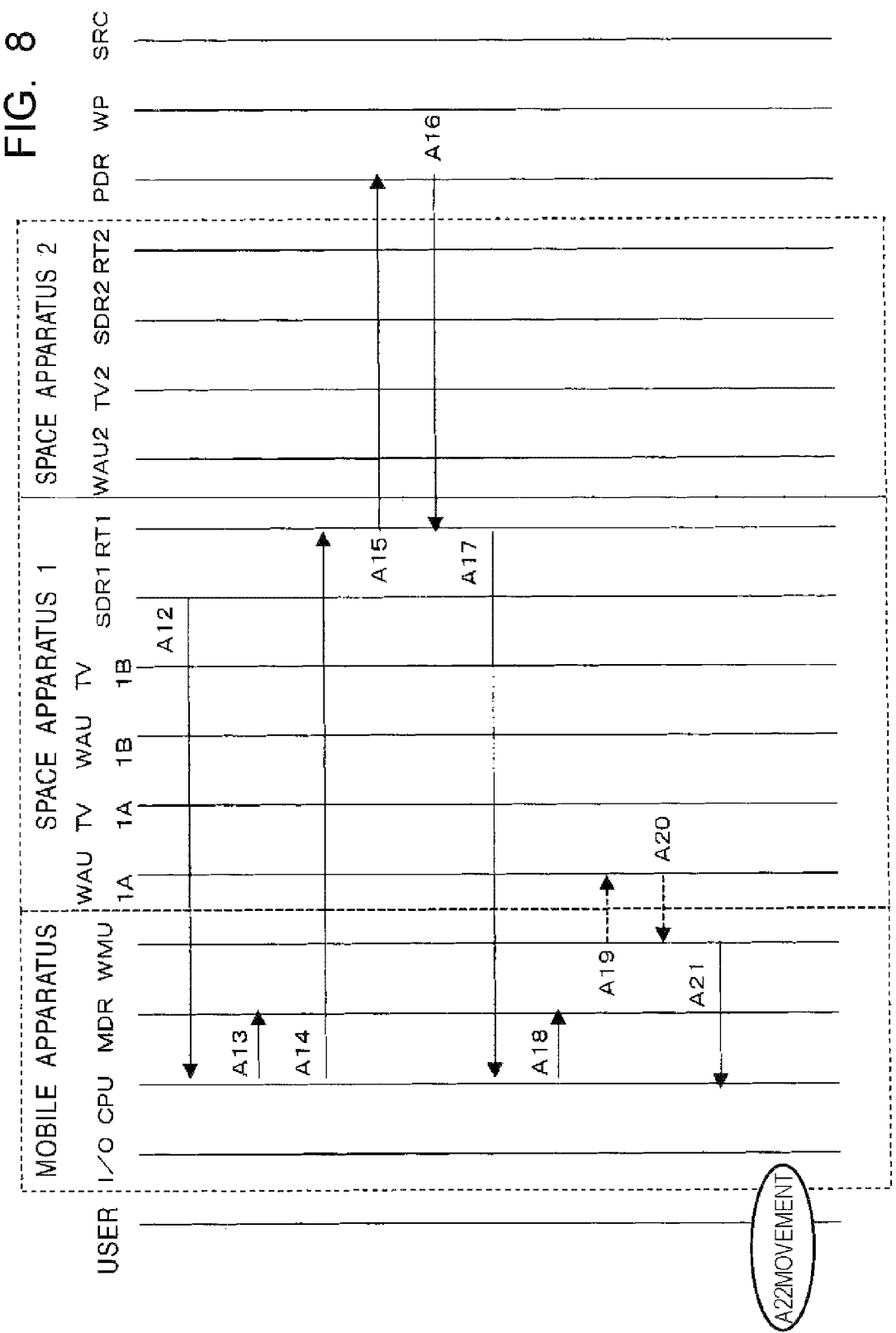
FIG. 8 shows the processing sequence performed by using the mobile apparatus.

Hereinafter, steps (A12) to (A22) will be described with reference to FIG. 8.

(A12) Notification of Space Information

"trmpID2-1 (effective during session)," which is issued as proof of authentication of the mobile directory (MDR) by the space directory (SDR1), and the addresses and attributes of the TV1A and TV1B, which are locally-connected information processors managed by the space directory (SDR1), are notified as space information.

(A13) Update of Mobile Directory (MDR)

A pair of the identifier (SID) and the address of the space directory (SDR1), a default router (defRT1), "trmpID2-1" issued as a proof of authentication of the mobile directory (MDR) by the space directory (SDR1), and information of the TV1A and TV1B as locally-connected 15 information processors are added.

(A14) Registration of Position (Transmission from Mobile Apparatus to Router)

MDR synchronization is started by LDAP (Light Weight Access Protocol) to the address of the personal directory (PDR) stored in the default public-key certificate (defCert), which is stored in the mobile apparatus. At this time, the identifier of the MDR (mdrId) and synchronization information are transmitted.

The LDAP (Light-Weight Directory Access Protocol) is a database which manages data hierarchically and provides a directory service. A "directory" originally refers to a name list, a telephone-number list, or a catalog. A directory service refers to a service in which a user makes an inquiry about someone's name, and then a name list or telephone-number list is searched and the result is returned to the user. That is, the directory service is a kind of inquiry to a database. The LDAP has the following characteristics.
1. Data is managed in a tree structure.
2. The operation speed is high.
3. Operates in a client server.
4. Mainly performs search.

Also, the applications of the LDAP include the following:
1. Management of information about the organization and workers in a company or school.
2. Collective management of user information and passwords.
3. Book database in a library.
4. List of e-mail addresses.
5. Substitution of domain name service (DNS).

In this way, in the LDAP, hierarchically managed data (in a tree structure) can be quickly searched.

(A15) Registration of Position (Transmission from Router to PDR)

The defRT designated as the default router starts routing to the final address. After that, the information is automatically transferred to the PDR through the Internet.

(A16) Response to Registration of Position (From PDR to Router)

The key and certificate which are effective while the user carries the mobile apparatus are transmitted. If information from the personal directory (PDR) exists, information including an address book, a schedule, and a list of belongings is updated at this time.

(A17) Response to Registration of Position (From Router to Mobile Apparatus)

Basically, the mobile directory (MDR) of each user is individually managed by the personal directory (PDR). However, one mobile directory can be shared by a plurality of users, such as family members. In that case, a user recognition sequence is performed just after this step.

(A18) The Mobile Directory (MDR) of the Mobile Apparatus is Updated Based on MDR Update.

Steps A1 to A18 are included in an initialization process which is performed before the user goes out carrying the mobile apparatus.

Steps A19 to A21 correspond to a periodically-performed picocell update process.

(A19) Search for Cells

Periodically updating of a list of apparatuses functioning as slaves by using a standard picocell management function of Bluetopth.

(A20) Response from Wireless Access Unit (WAU1)

The wireless access unit (WAU1) responds to cell search. In this case, since the user is not moved, the state of slave apparatuses near the user remains the same. However, the wireless master unit (WMU) of the mobile apparatus does not determine whether or not any change has occurred.

(A21) Reports Cell State

The CPU is notified of update of information by the wireless master unit (WMU) of the mobile apparatus, compares the updated information with the previous information, and determines whether or not the mobile directory (MDR) need be updated. In this case, updating is unnecessary, and the process is completed.

(A22) Movement of User (Movement of Mobile Apparatus)

When the user moves, the range of reach of radio waves from the mobile apparatus changes correspondingly, and the type of slave terminals which can perform communication changes.

Figure 9:
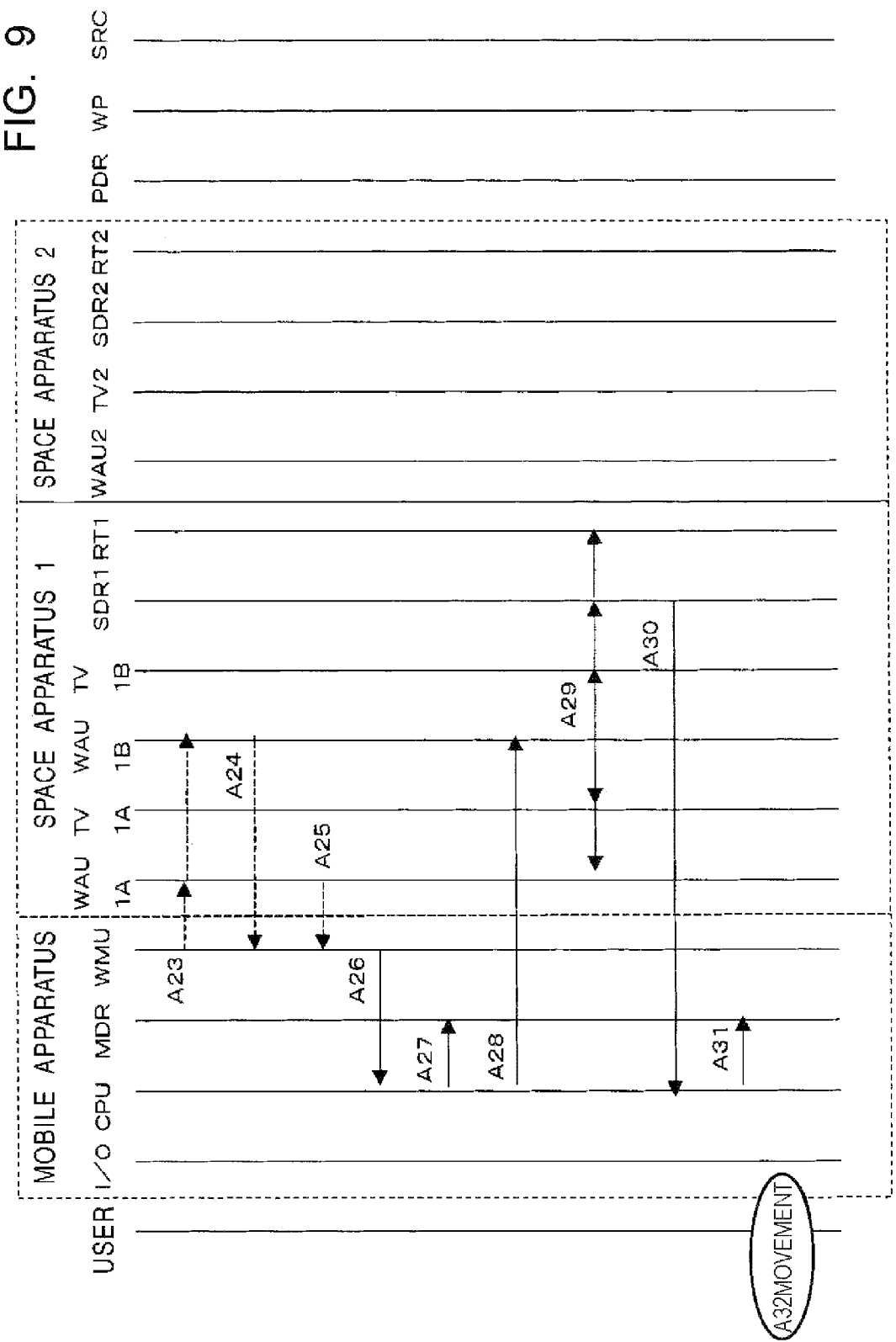
FIG. 9 shows the processing sequence performed by using the mobile apparatus.

Hereinafter, steps (A23) to (A32) will be described with reference to FIG. 9.

(A23) Search for Cells

This is performed as a periodical update of slave information, and cells are searched for as in step (A19).

(A24) Response from Wireless Access Unit (WAU1B)

After the user has moved, the wireless access unit (WAU1B) of the information processor of the space apparatus 1 can communicate with the mobile apparatus carried by the user, and the wireless master unit (WMU) of the mobile apparatus recognizes the WAU1B.

(A25) Response from Wireless Access Unit (WAU1A)

Also, the wireless access unit (WAU1A) which has been used for communication still may be recognized because it is in the communication area of the mobile apparatus and, thus, the response from the wireless access unit (WAU1A) also is received.

(A26) Reports the State of Cells

The wireless master unit (WMU) notifies the CPU of the mobile apparatus of slave information which has been collected for a predetermined time after step (A23). Determination by the WMU is not performed.

(A27) Updates Mobile Directory (MDR)

Based on new information, the CPU of the mobile apparatus updates the mobile directory (MDR). In this case, the wireless access unit (WAU1B) is added.

(A28) Search for SDR Via Wireless Access Unit (WAU1B)

SDR search instructions are transmitted to a wired network interface (NIC) of the wireless access unit (WAU1B), which has been newly registered on the mobile directory (MDR) of the mobile apparatus by using broadcast addresses and by designating a UDP fixed port.

(A29) Broadcasting to Segments by Wireless Access Unit (WAU1B)

Instructions of searching for SDR are broadcasted to wired segments from the WAU1B.

(A30) Response from the Same Space Directory (SDR)

In this case, the user does not move so much; that is, the user moves within one segment. Thus, the space directory (SDR) having the identifier which is the same as the identifier now being used notifies the mobile apparatus of "SID, defRT, and tempID (challenge)." However, it is not always the SDR which performed previous notification that performs notification.

(A31) Updates Mobile Directory (MDR)

The CPU of the mobile apparatus determines the access point managed by the same space directory (SDR). One of the wireless access units WAU1A and WAU1B is selected based on the state of radio waves.

(A32) Movement of User (Movement of Mobile Apparatus)

When the user moves, the mobile apparatus also moves. The mobile apparatus enters the communication area of the wireless access unit (WAU2) which is managed by another segment (=another SDR) belonging to the space apparatus 2. At this time, the wireless access unit (WAU1A) is out of the communication area, whereas the wireless access unit (WAU1B) is still in the communication area.

Figure 10:
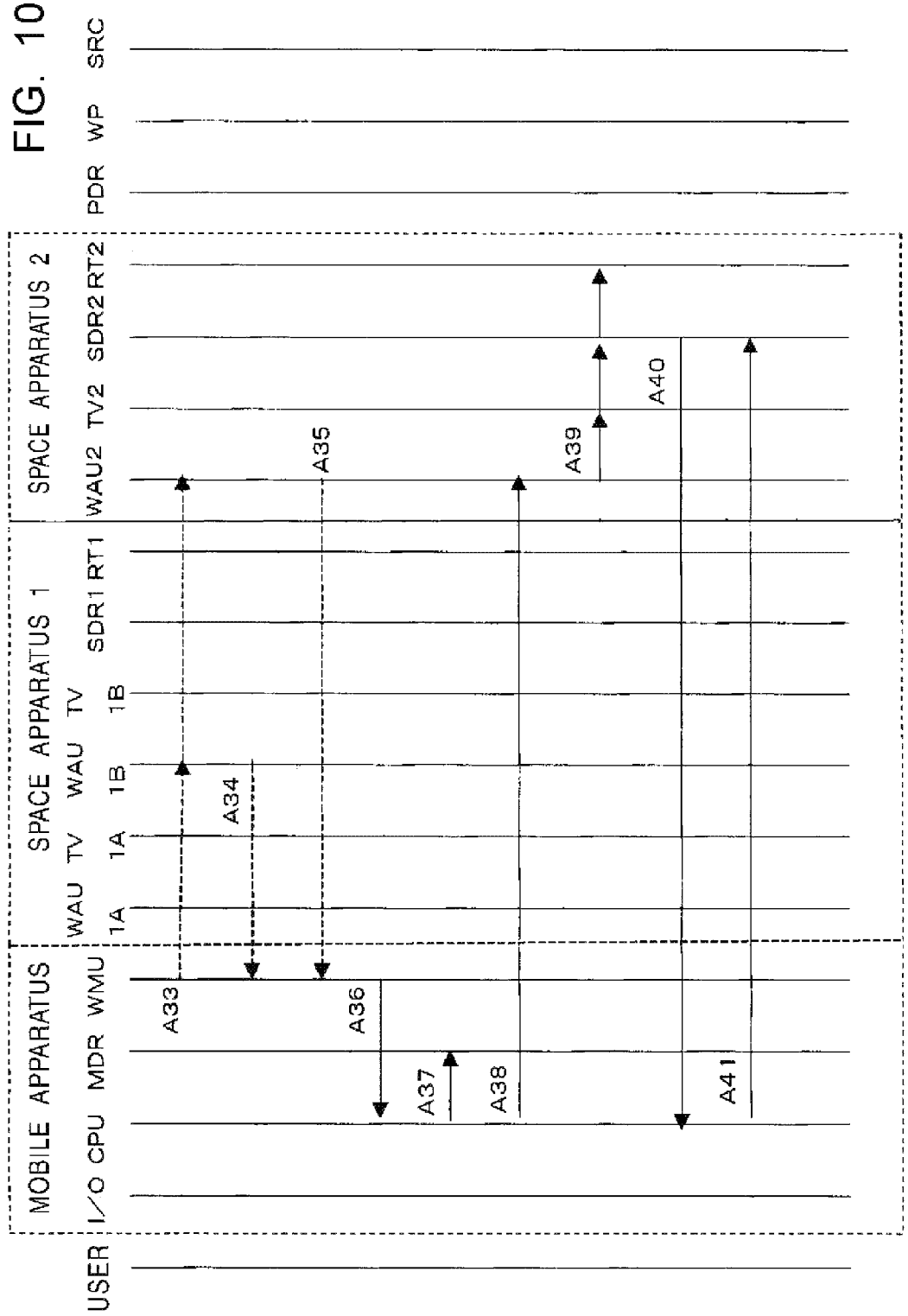
FIG. 10 shows the processing sequence performed by using the mobile apparatus.

Hereinafter, steps (A33) to (A41) will be described with reference to FIG. 10.

(A33) Search for Cells

The mobile apparatus periodically updates slave information (same as step (A19)).

(A34) Response from Wireless Access Unit (WAU1B)

This recognizes the wireless access unit (WAU1B) which is now being used for communication as a primary wireless access unit (WAU).

(A35) Response from Wireless Access Unit (WAU2)

Newly recognizes the wireless access unit (WAU2) which has not been recognized by the mobile apparatus.

(A36) Reports the State of Cells

The wireless master unit (WMU) notifies the CPU of slave information which has been collected for a predetermined time after step (A33).

(A37) Updates Mobile Directory (MDR)

The CPU of the mobile apparatus records in the mobile directory (MDR) that the wireless access unit (WAU1A) is out of the communication area and that the wireless access unit (WAU2) has been newly recognized.

(A38) Search for SDR Via Wireless Access Unit (WAU2)

SDR-search instructions are transmitted to a wired network interface (NIC) of the wireless access unit (WAU2) by using broadcast addresses and by designating a UDP fixed port.

(A39) Broadcasting to Segments by Wireless Access Unit (WAU2)

Instructions of searching for SDR are broadcasted to wired segments from the wireless access unit (WAU2).

(A40) Response from Space Directory (SDR2)

In response to the broadcasting performed in step (A39), the space directory (SDR2) which manages connected segments of the wireless access unit (WAU2) responds to the mobile apparatus. "SID2, defRT2, and tempID1-2 (challenge)" is notified.

(A41) Request for Space Information

The CPU of the mobile apparatus recognizes that the space is different from the known space based on the received space directory identifier (SID), and transmits a request together with "SID and tempID."

Figure 11:
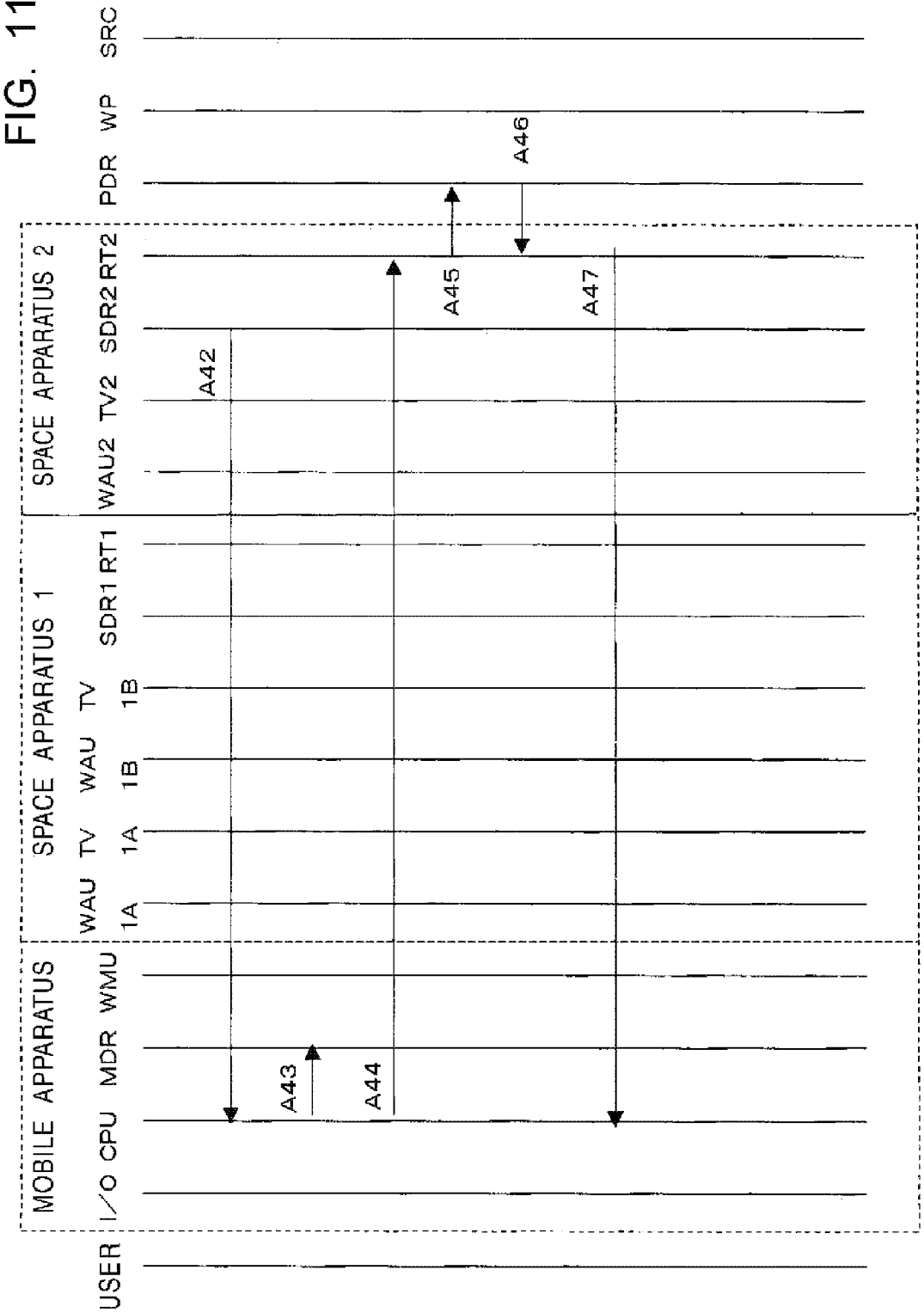
FIG. 11 shows the processing sequence performed by using the mobile apparatus.

Hereinafter, steps (A42) to (A47) will be described with reference to FIG. 11.

(A42) Notification of Space Information

The space directory (SDR2) notifies the CPU of trmpID2 25 (effective during session), which is issued by the space directory (SDR2) as proof of authentication of the mobile directory (MDR) in the mobile apparatus, and the address and attribute of the TV2 which is managed by the space directory (SDR2).

(A43) Updates Mobile Directory (MDR)

The mobile apparatus updates the mobile directory (MDR). That is, a pair of identifier (SID) and address of the space directory (SDR2), defRT2, tempID2-2, and information of the TV2 are added.

(A44) Transmits Registration of Position to the Router (RT2) Managed by the Space Directory (SDR2)

MDR synchronization is started by LDUP to the PDR address stored in the default public-key certificate (defCert) which is stored in the mobile apparatus. At this time, the identifier of the MDR (mdrId) and synchronization information (Sync) are transmitted.

(A45) Registration of Position (From RT2 to PDR)

The defRT designated as the default router starts routing to the final address. After that, the information is automatically transferred to the PDR through the Internet.

(A46) Response to Registration of Position (From PDR to RT2)

The key and certificate which are effective while the user carries the mobile apparatus are notified and processed. If information from the personal directory (PDR) exists, update is performed at this time. The updated information includes an address book, a schedule, and a list of belongings.

(A47) Response to Registration of Position (From RT2 to Mobile Apparatus)

Response to registration of position is transmitted from the RT2 to the mobile apparatus. Basically, the mobile directory (MDR) of each user is individually managed by the personal directory. However, the mobile directory can be shared by a number of users, such as family members. In such case, a user recognition sequence is performed just after the response.

(A48) Updates Mobile Directory (MDR)

The mobile directory (MDR) of the mobile apparatus is updated based on the information notified in step (A46).

As described above, the mobile apparatus stores the information about apparatuses near the user in the mobile directory in accordance with the movement of the user. Accordingly, the mobile apparatus can always hold the latest information about nearby information processors. Based on the information, the mobile apparatus transmits a service request to a service provider which distributes content or a service provider which provides a communication service via the nearby apparatus and a network.

The service provider which has received the service request performs user authentication based on user information, which is transmitted together with the service request. Further, based on the information about the nearby apparatuses transmitted from the mobile apparatus, services can be provided in accordance with the user's preference via the nearby apparatuses. For example, content can be distributed to a television set. Also, communication using the mobile apparatus serving as a communication apparatus can be performed by transmitting user information and apparatus information stored in the mobile directory to a communication service provider, so that the mobile apparatus is authenticated by the service provider.

In the example of the processing sequence described with reference to FIGS. 7 to 11, the space directory (SDR) is included in each space apparatus. However, as described above, the space directory (SDR) which stores information of information processors may not be provided. In that case, each of the PCs and other information appliances stores its own information in its own storage unit and performs communication with the mobile directory (MDR) of the mobile terminal carried by the user through Bluetooth or the like, so that required information of the information processors can be stored as mobile directory information. Further, each information processor can transmit its own information to a service provider or a personal directory (PDR) via its own communication interface.

Accordingly, the processing performed by the space directory in the sequence described with reference to FIGS. 7 to 11 can be performed by using the function of each information processor itself, such as TV and WAU. In this case, the space directory (SDR) does not exist, but the same processing as the above-described processing sequence can be achieved.

Figure 15:
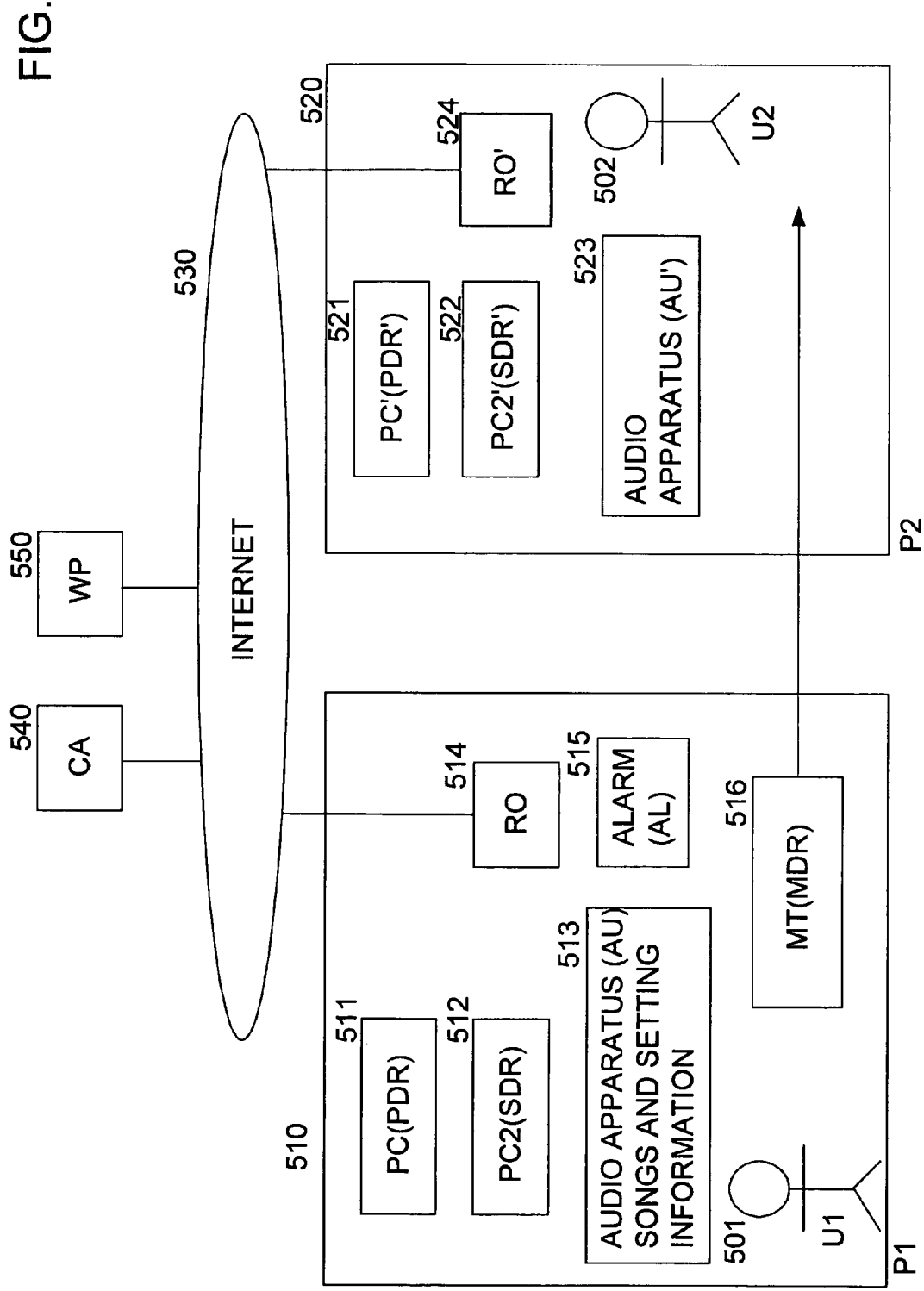
FIG. 15 illustrates a specific example of processing applying the configuration of the present invention.

Next, a specific example of processing using the configuration of the present invention will be described with reference to FIG. 15.

Various information processors in many users' homes are connected to the Internet 530. Herein, a home-Pi 510 of a user-U1 501 and a home-P2 520 of a user-U2 502 are shown. A certificate authority (CA) 540 and a white page (WP) as a directory provided by a service provider are connected to the Internet 530.

The user-U1 501 has, in his/her home-Pi 510, a PC (PDR) 511, in which a personal directory (PDR) managing his/her (user-U1 501) personal information operates; a PC2 (SDR) 512, in which a space directory (SDR) managing apparatuses in the home operates; an audio apparatus (AU) 513 managed by the PC2 (SDR) 512; a router (RO) 514 connected to the Internet 530; and a mobile terminal (MT) (MDR) 516, which is usually carried by the user and in which a mobile directory (MDR) operates. These units are connected in a wired or wireless manner so as to form a home network.

The audio apparatus (AU) 513 stores songs to which the user often listen and setting information of user's preference, such as setting of an equalizer. The PC (PDR) stores information notified from the MT (MDR) 516, such as the information about apparatuses near the user-U1 501, an apparatus or application being used by the user-U1 501, and the position of the user-U1 501.

Likewise, in the home-P2 520 of the other user-U2 502, a PC' (PDR') 521 in which a personal directory (PDR') operates; a PC2' (SDR') 522 in which a space directory (SDR') operates; and an audio apparatus (AU') 523 are mutually connected so as to form a home network. The home network is connected to the Internet 530 via a router (RO') 524.

Herein, assume that the user-U1 501 visits the home-P2 520 of the user-U2 502 while carrying the MT (MDR) 516.

When the MDR, which operates in the MT (MDR) 516 carried by the user-U1 501, enters the area of the home-P2 520 of the user-U2 502, the MDR receives a signal from the PC2' (SDR') 522 in the home-P2 520 of the user-U2 502 and transmits a request for obtaining the environment to the PC2' (SDR') 522. The PC2' (SDR') 522 receives the request for obtaining the environment from the MT (MDR) 516 carried by the user-U1 501 and notifies the MT (MDR) 516 of the information about connected apparatuses (in this case, the audio apparatus (AU') 523 and the router (RO')).

The MT (MDR) 516 carried by the user-U1 501 displays therein that the audio apparatus (AU') 523 has been detected and a menu for selecting to use it. The menu may be displayed either in the MT (MDR) 516 carried by the user-U1 501 or in an apparatus (e.g., audio apparatus (AU') 523) managed by the PC2' (SDR') 522 in the home-P2 520 of the user-U2 502.

The information about such connected apparatuses also is transmitted from the MT (MDR) 516 carried by the user-U1 501 through the Internet 530 to the PC (PDR) 511, in which the PDR managing the personal information of the user-U1 501 operates, in the home-P1 510 of the user-U1 501. Accordingly, the PDR stores the information about the apparatuses.

When the user-U1 501 operates the menu and selects to use the audio apparatus (AU') 523, the operation menu for the audio apparatus (AU') 523 is displayed. The operation menu for the audio apparatus (AU') 523 is displayed in, for example, the MT (MDR) 516 carried by the user-U1 501 or an apparatus (e.g., audio apparatus (AU') 523) managed by the PC2' (SDR') 522 in the home-P2 520 of the user-U2 502.

The MT (MDR) 516 carried by the user-U1 501 notifies the PC (PDR) 511, in which the PDR managing the personal information of the user-U1 501 operates, in the home-P1 510 of the user-Ui 501, that the use of the audio apparatus (AU') 523 has been selected. Accordingly, the PDR 511 records that the user-U1 501 is using the audio apparatus (AU') 523. In an access menu, selection of a song or instructions of playback, stop, and volume adjustment can be performed.

The user-U1 501 can obtain the list of songs stored in 10 the audio apparatus (AU') by using the access menu and play back a desired song.

On the other hand, the user-U2 502 can inhibit the user-U1 501 from searching for a song stored in the audio apparatus (AU') 523 by setting information on his/her own PC' (PDR') 521, or on the PC2' (SDR') 522 or the audio apparatus (AU') 523.

The user-U1 501 can download the information of songs stored in the audio apparatus (AU) 513 in his/her home to the audio apparatus (AU') 523 in the home-P2 520 of the user-U2 502, play back the data by streaming it, or listen to songs by reflecting the information set in the audio apparatus (AU) 513 in his/her home onto the audio apparatus (AU') 523 in the home-P2 520 of the user-U2 502.

An alarm device (AL) 515 is placed in the home-Pi 510 of the user-Ui 501. The user sets the call time at the alarm device (AL) 515 in advance. When the specified time comes, the alarm device (AL) 515 notifies the PC (PDR) 511 in the home-Pi_ 510 of the user-U1 501 that the specified time has come. The PC (PDR) 511 checks the apparatus and application which are now being used by the user-U1 501, and instructs the audio apparatus (AU') 523 in the home-P2 520 of the user-U2 502 to notify the user of the alarm in a method according to the used apparatus and application. For example, since the PC (PDR) 511 in the home-Pi 510 of the user-U1 501 knows that the user-U1 501 is now using the audio apparatus (AU') 523 in the home-P2 520 of the user-U2 502, the PC (PDR) 511 instructs the audio apparatus (AU') 523 in the home-P2 520 of the user-U2 502 to sound an alarm which can be generated by the audio apparatus (AU') 523.

The series of processes described above may be executed by hardware, software, or a combination of hardware and software. When the processes are executed by software, a program including the processing sequence is installed in a memory of a computer incorporated in dedicated hardware so as to be executed, or the program is installed in a multi-purpose computer which can perform various processes so as to execute the program.

For example, the program can be recorded in a hard disk or a ROM serving as a recording medium in advance. Alternatively, the program can be temporarily or permanently stored (recorded) in a removable recording medium, such as a flexible disc, a compact disc read only memory (CD-ROM), a magneto-optical (MO) disc, a digital versatile disc (DVD), a magnetic disc, or a semiconductor memory. Such a removable recording medium can be provided as so-called package software.

The program can be installed in a computer through the above-described removable recording medium. Alternatively, the program can be wirelessly transferred from a download site to a computer, or can be transferred to a computer in a wired manner through a network such as a local area network (LAN) or the Internet. The computer receives the transferred program, so that the program is installed in a recording medium, such as a hard disk, incorporated therein.

The various processes described in the description may be performed in time series in the described order.

Alternatively, the processes may be performed in parallel or individually as required or in accordance with the processing ability of the device performing the processes.

INDUSTRIAL APPLICABILITY

As described above, according to the present invention, a mobile information processor or a mobile apparatus which can be carried by a user collects information of accessible nearby apparatuses from a space directory (SDR) storing the information of the nearby apparatuses, generates mobile directory information in a storage unit based on the collected information, and updates the information. Accordingly, the user can obtain the information about various information processors near the user unconsciously without performing a special process. Furthermore, the mobile apparatus can receive various information processing services, such as content distribution and communication services, by using the nearby apparatuses based on the obtained information. This configuration can be applied when the user moves from one location to another and uses various information processors at a location away from home or office.

Also, personal information can be stored in a number of apparatuses. That is, the original of the personal information can be stored in a PDR and part of the information can be stored in an MDR. Further, processing such as authentication is performed in different apparatuses for each user in a distributed manner. Therefore, the centralization of processing regarding personal information can be alleviated and a decrease in the processing speed can be prevented. Further, personal information is basically managed by a PDR in a user's own apparatus and a service provider need not manage the personal information. Therefore, leakage of personal information from the service provider can be prevented, and the user can safely use a system of providing services based on various personal information.

Although the present invention has been described with reference to specific embodiments, those of skill in the art will recognize that changes may be made thereto without departing from the spirit and scope of the present invention as set forth in the hereafter appended claims.

The invention claimed is:

1. A mobile information processor comprising:
a processor; and
a memory device which stores instructions, which when executed by the processor, cause the processor to:
(a) access a space directory which stores identification information of the external apparatus;
(b) transmit, in response to a transmission challenge from the space directory, encrypted data of the challenge created by its own secret key together with a public-key certificate to the space directory;
(c) receive the identification information of the external apparatus from the space directory;
(d) acquire user information from a remote user information database, said remote user information database being configured to, using identification information of said external apparatus, determine the user information;
(e) thereafter, transmit, to a service provider, the acquired user information from the remote user information database, said service provider being configured to determine whether a communication service can be provided based on said transmitted user information;
(f) communicate with a personal directory which stores original data of the identification information of the external apparatus so as to register position information of the mobile information processor in the personal directory, wherein said external apparatus includes an access point; and
(g) in response to a determination that the communication service can be provided based on said transmitted user information transmitted to said service provider, utilize said communication service.

2. The mobile information processor of claim 1, wherein when executed by the processor, the instructions cause the processor to receive the identification information of the external apparatus from a space directory, wherein said space directory:
(a) stores the identification information of the external apparatus; and
(b) updates the identification information of the external apparatus.

3. The mobile information processor of claim 1, wherein when executed by the processor, the instructions cause the processor to:
(a) receive the identification information of the external apparatus from a space directory which stores the identification information of the external apparatus; and
(b) in response to a transmission challenge from the space directory, transmit encrypted data of the challenge created by its own secret key together with a public-key certificate to the space directory.

4. The mobile information processor of claim 1, wherein when executed by the processor, the instructions cause the processor to perform Bluetooth wireless communication.

5. The mobile information processor of claim 1, wherein when executed by the processor, the instructions cause the processor to periodically collect the identification information of the external apparatus.

6. An information processor comprising:
a processor; and
a memory device which stores instructions, which when executed by the processor, cause the processor to:
(a) perform data communication with: (i) a mobile information processor; and (ii) an external apparatus including identification information;
(b) access a space directory which stores the identification information of the external apparatus;
(c) transmit, in response to a transmission challenge from the space directory, encrypted data of the challenge created by its own secret key together with a public-key certificate to the space directory;
(d) receive the identification information of the external apparatus from the space directory;
(e) acquire user information from a remote user information database, the remote user information database being configured to determine the user information using the identification information of said external apparatus;
(f) transmit, to a service provider, the acquired user information, said service provider being configured to determine whether a communication service can be provided based on said transmitted user information;
(g) communicate with a personal directory which stores original data of the identification information of the external apparatus so as to register position information of the mobile information processor in the personal directory, wherein said external apparatus includes an access point; and
(i) in response to a determination that the service request can be provided based on said acquired user information, provide said collected identification information to the mobile information processor.

7. An information processor comprising:
a processor; and
a memory device which stores instructions, which when executed by the processor, cause the processor to:
(a) perform data communication with: (i) a mobile information processor; and (ii) an external apparatus including identification information;
(b) access a space directory which stores identification information of the external apparatus;
(c) transmit, in response to a transmission challenge from the space directory, encrypted data of the challenge created by its own secret key together with a public-key certificate to the space directory;
(d) receive the identification information of the external apparatus from the space directory;
(e) acquire user information which is stored by a remote user information database, said remote user information database being configure to determine the user information based on said identification information of said external apparatus;

(f) receive a service request from the external apparatus based on the acquired user information;

(g) determine whether a communication service can be provided based on: (i) said acquired user information; and (ii) said identification information;

(h) communicate with a personal directory which stores original data of the identification information of the external apparatus so as to register position information of the mobile information processor in the personal directory, wherein said external apparatus includes an access point; and (i) in response to a determination that the communication service can be provided based on: (i) said acquired user information; and (ii) said identification information, provide the communication service to the mobile information processor.

8. The information processor of claim 7, wherein when executed by the processor, the instructions cause the processor to transmit the identification information to the mobile information processor.

9. The information processor of claim 7, wherein when executed by the processor, the instructions cause the processor to:

(a) before transmitting the identification information, perform authentication processing by challenge response;

(b) perform challenge transmission; and (c) receive encrypted data of the challenge transmission created by a secret key of the external apparatus and a public-key certificate as a response from the mobile information processor.

10. The information processor of claim 7, wherein when executed by the processor, the instructions cause the processor to perform Bluetooth wireless communication.

11. A data communication system comprising:

a mobile apparatus including:
(a) a first processor; and
(b) a first memory device storing instructions, which when executed by the first processor, cause the first processor to collect identification information of an external apparatus which can communicate with the mobile apparatus; and a personal directory including:
(a) a second processor; and
(b) a second memory device storing instructions, which when executed by the second processor, cause the second processor to:
(i) perform data communication with: (A) the mobile apparatus; and (B) the external apparatus;
(ii) access a space directory which stores identification information of the external apparatus;
(iii) transmit, in response to a transmission challenge from the space directory, encrypted data of the challenge created by its own secret key together with a public-key certificate to the space directory;
(iv) receive the identification information of the external apparatus from the space directory;
(v) acquire user information which is stored by a remote user information database, said remote user information database being configured to, using said identification information of said external apparatus, determine the user information, wherein said external apparatus includes an access point;
(vi) receive a service request from the mobile apparatus through a network based on the acquired user information;
(vii) determine whether a communication service can be provided based on: (i) said acquired user information; and (ii) said identification information; and
(viii) in response to a determination that the communication service can be provided based on: (i) said acquired user information; and (ii) said identification information, provide the communication service to the mobile apparatus.

12. The data communication system of claim 11, further comprising a service provider, wherein the service provider provides a second communication service based on information obtained from the personal directory.

13. The data communication system of claim 11, further comprising a space directory server which stores the identification information of the external apparatus.

14. The data communication system of claim 13, wherein the communication service providing process is performed through a service provider.

15. A method of operating a mobile information processor including instructions, the method comprising:

(a) causing a processor to execute the instructions to access a space directory which stores identification information of an external apparatus;

(b) causing the processor to execute the instructions to transmit, in response to a transmission challenge from the space directory, encrypted data of the challenge created by its own secret key together with a public-key certificate to the space directory;

(c) causing the processor to execute the instructions to receive the identification information of the external apparatus from the space directory;

(d) causing the processor to execute the instructions to acquire user information from a remote user information database, the remote user information database being configured to, using the identification information of said external apparatus, determine the user information;

(e) causing the processor to execute the instructions to transmit, to a service provider, the acquired user information, said service provider being configured to determine whether a communication service can be provided based on said acquired user information transmitted to said service provider;

(f) causing the processor to execute the instructions to communicate with a personal directory which stores original data of the identification information of the external apparatus so as to register position information of the mobile information processor in the personal directory, wherein said external apparatus includes an access point; and (g) in response to a determination that the communication service can be provided based on said acquired user information transmitted to said service provider, utilize said communication service.

16. A method of operating a mobile information processor including instructions, the method comprising:

(a) causing a processor to execute the instructions to access a space directory which stores identification information of an external apparatus;

(b) causing the processor to execute the instructions to transmit, in response to a transmission challenge from the space directory, encrypted data of the challenge created by its own secret key together with a public-key certificate to the space directory;

(c) causing the processor to execute the instructions to receive the identification information of the external apparatus from the space directory;

(d) causing the processor to execute the instructions to transmit said collected identification information to a remote user information database, wherein the remote user database is configured to, using the transmitted identification information, determine user information;

(e) causing the processor to execute the instructions to acquire said user information that was determined by the remote user information database based on the identification information of said external apparatus;

(f) thereafter, causing the processor to execute the instructions to transmit, to a service provider, the acquired user information from the remote user information database, said service provider being configured to determine whether a communication service can be provided based on said acquired user information transmitted to said service provider;

(g) causing the processor to execute the instructions to communicate with a personal directory which stores original data of the identification information of the external apparatus so as to register position information of the mobile information processor in the personal directory, wherein said external apparatus includes an access point; and (h) in response to a determination that the communication service can be provided based on said acquired user information transmitted to said service provider, causing the processor to execute the instructions to utilize said service communication service.

17. The data communication method of claim 16, which includes causing the processor to execute the instructions to obtain the identification information from a space directory server which stores the identification information.

18. The data communication method of claim 16, which includes transmitting the communication service request through the service provider.

19. A non-transitory computer readable medium storing instructions structured to cause a mobile information processor to:

(a) access a space directory which stores identification information of an external apparatus;

(b) transmit, in response to a transmission challenge from the space directory, encrypted data of the challenge created by its own secret key together with a public-key certificate to the space directory;

(c) receive the identification information of the external apparatus from the space directory;

(d) acquire user information from a remote user information database, said remote user information database being configured to, using identification information of said external apparatus, determine the user information;

(e) transmit, to a service provider, the acquired user information, said service provider being configured to determine whether a communication service can be provided based on said transmitted user information;

(f) communicate with a personal directory which stores original data of the identification information of the external apparatus so as to register position information of the mobile information processor in the personal directory, wherein said external apparatus includes an access point; and (g) in response to a determination that the communication service can be provided based on said transmitted user information, utilize said communication service.

20. A non-transitory computer readable medium storing instructions structured to cause a mobile information processor to:

(a) access, from a local area, an external apparatus which includes identification information;

(b) transmit, in response to a transmission challenge from the external apparatus, encrypted data of the challenge created by its own secret key together with a public-key certificate to the external apparatus;

(c) receive the identification information from the external apparatus;

(d) acquire user information from a remote user information database, the remote user information database being configured to, using the identification information of said external apparatus, determine the user information;

(e) transmit, to a service provider, the acquired user information, said service provider being configured to determine whether a communication service can be provided based on said transmitted user information;

(f) communicate with a personal directory which stores original data of the identification information of the external apparatus so as to register position information of the mobile information processor in the personal directory, wherein said external apparatus includes an access point; and (g) in response to a determination that the communication service can be provided based on the said transmitted user information, utilize said communication service.

* * * * *